(12) United States Patent
Dantkale et al.

(10) Patent No.: US 10,445,004 B2
(45) Date of Patent: Oct. 15, 2019

(54) LOW LATENCY METADATA LOG

(71) Applicant: Pavilion Data Systems, Inc., San Jose, CA (US)

(72) Inventors: Suhas Dantkale, Cupertino, CA (US); Venkeepuram R. Satish, Fremont, CA (US); Raghuraman Govindasamy, San Jose, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 150 days.

(21) Appl. No.: 15/475,098

(22) Filed: Mar. 30, 2017

(65) Prior Publication Data

US 2018/0284995 A1    Oct. 4, 2018

(51) Int. Cl.
*G06F 3/06* (2006.01)
*G06F 12/0868* (2016.01)
(Continued)

(52) U.S. Cl.
CPC .......... *G06F 3/0611* (2013.01); *G06F 3/065* (2013.01); *G06F 3/0665* (2013.01); *G06F 3/0689* (2013.01); *G06F 12/0808* (2013.01); *G06F 12/0811* (2013.01); *G06F 12/0868* (2013.01); *G06F 12/128* (2013.01); *G06F 12/0246* (2013.01); *G06F 12/12* (2013.01); *G06F 2212/283* (2013.01);
(Continued)

(58) Field of Classification Search
CPC ............. G06F 11/1435; G06F 11/1451; G06F 12/0808; G06F 12/0811; G06F 12/1063; G06F 12/128; G06F 2201/84; G06F 2212/283; G06F 2212/621; G06F 2212/681; G06F 2212/69; G06F 3/0611; G06F 3/0665; G06F 3/0689
See application file for complete search history.

(56) References Cited

U.S. PATENT DOCUMENTS 5,790,775 A    8/1998   Marks et al.
9,075,708 B1   7/2015   Kang et al.
(Continued)

OTHER PUBLICATIONS

Notice of Allowance for U.S. Appl. No. 15/475,100 dated Sep. 6, 2018.
(Continued)

*Primary Examiner* — Mano Padmanabhan
*Assistant Examiner* — William E. Baughman
(74) *Attorney, Agent, or Firm* — Lowenstein Sandler LLP

(57) ABSTRACT

A storage server includes a first controller, a second controller and physical drives. The first controller receives a request to store data in a virtual block address (VBA) of a virtual drive, determines a physical block address (PBA) of a physical drive on which to store the data, and sends to the physical drive a command to store the data at the PBA. The first controller generates a first metadata update for a first metadata table associated with the virtual drive, wherein the first metadata update indicates a mapping of the VBA to the PBA. The first controller generates a second metadata update for a second metadata table that identifies statuses of PBAs, wherein the second metadata update indicates that the PBA is valid. The first controller writes an entry to a cache in a memory, the entry comprising the first metadata update and the second metadata update.

27 Claims, 15 Drawing Sheets

(51) Int. Cl.
*G06F 12/0808* (2016.01)
*G06F 12/0811* (2016.01)
*G06F 12/128* (2016.01)
G06F 12/02 (2006.01)
G06F 12/12 (2016.01)

(52) U.S. Cl.
CPC ............... *G06F 2212/7201* (2013.01); *G06F 2212/7203* (2013.01); *G06F 2212/7207* (2013.01); *G06F 2212/7208* (2013.01)

(56) References Cited

U.S. PATENT DOCUMENTS

| | | |
|---|---|---|
| 2005/0240803 A1 | 10/2005 | Saika et al. |
| 2008/0005614 A1 | 1/2008 | Lubbers et al. |
| 2008/0082770 A1 | 4/2008 | Ahal et al. |
| 2011/0010560 A1 | 1/2011 | Etchegoyen |
| 2014/0047263 A1 | 2/2014 | Coatney et al. |
| 2015/0106551 A1* | 4/2015 | Kim .................. G06F 12/0246 711/103 |
| 2015/0134875 A1 | 5/2015 | Veal |
| 2016/0085628 A1 | 3/2016 | Hayes et al. |
| 2016/0170833 A1 | 6/2016 | Segura et al. |
| 2016/0210073 A1* | 7/2016 | Muroyama .......... G06F 3/0625 |
| 2016/0335006 A1 | 11/2016 | Rose |
| 2017/0046259 A1 | 2/2017 | McKean et al. |
| 2017/0046268 A1 | 2/2017 | Ummadi et al. |

OTHER PUBLICATIONS

European Patent Office, Extended Search Report for European Patent Application No. 18164917.9 dated Jul. 27, 2018, 11 pages.
European Patent Office, Extended Search Report for European Patent Application No. 18164922.9 dated Jul. 27, 2018, 10 pages.
U.S. Appl. No. 15/475,100, Recovery Mechanism for Low Latency Metadata Log, filed Mar. 30, 2017.

* cited by examiner

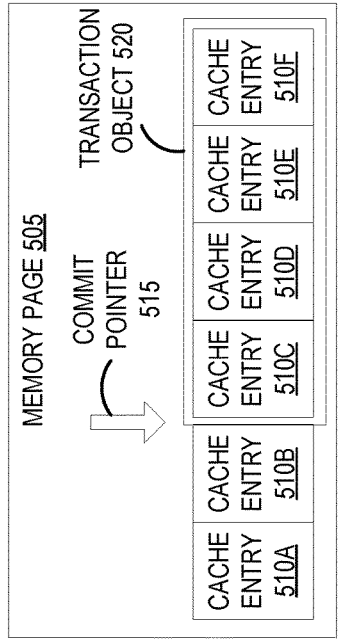

LOW LATENCY METADATA LOG

FIELD OF TECHNOLOGY

This disclosure relates generally to the field of data storage and in particular to metadata management for storage devices.

BACKGROUND

In a complex storage system, the transactional persistency of metadata should be maintained so that the integrity of data is maintained in the event of a system crash, shutdown or unplanned power outage. Traditionally, metadata is maintained in an on-disk journal on a persistent storage device, where the on-disk journal is updated synchronously with data being written to a persistent storage device (e.g., as part of an inline code path in the context of an input/output operation, referred to herein as an IO core path). Accordingly, writing data to persistent storage generally includes a first write operation that writes the data to a persistent storage device and at least one additional write operation that writes metadata for that data to the persistent storage device. The additional write operation for the metadata to the persistent storage device increases latency.

BRIEF DESCRIPTION OF THE DRAWINGS

The embodiments described herein will be understood more fully from the detailed description given below and from the accompanying drawings.

FIG. 4C is a block diagram of a superblock for an L1 cache, in accordance with embodiments of the present invention.

FIG. 5 is a block diagram of a memory page for an L1 or L2 cache, in accordance with embodiments of the present invention.

FIG. 6 is a block diagram of a virtual block address translation table, in accordance with embodiments of the present invention.

DETAILED DESCRIPTION

Figure 1:
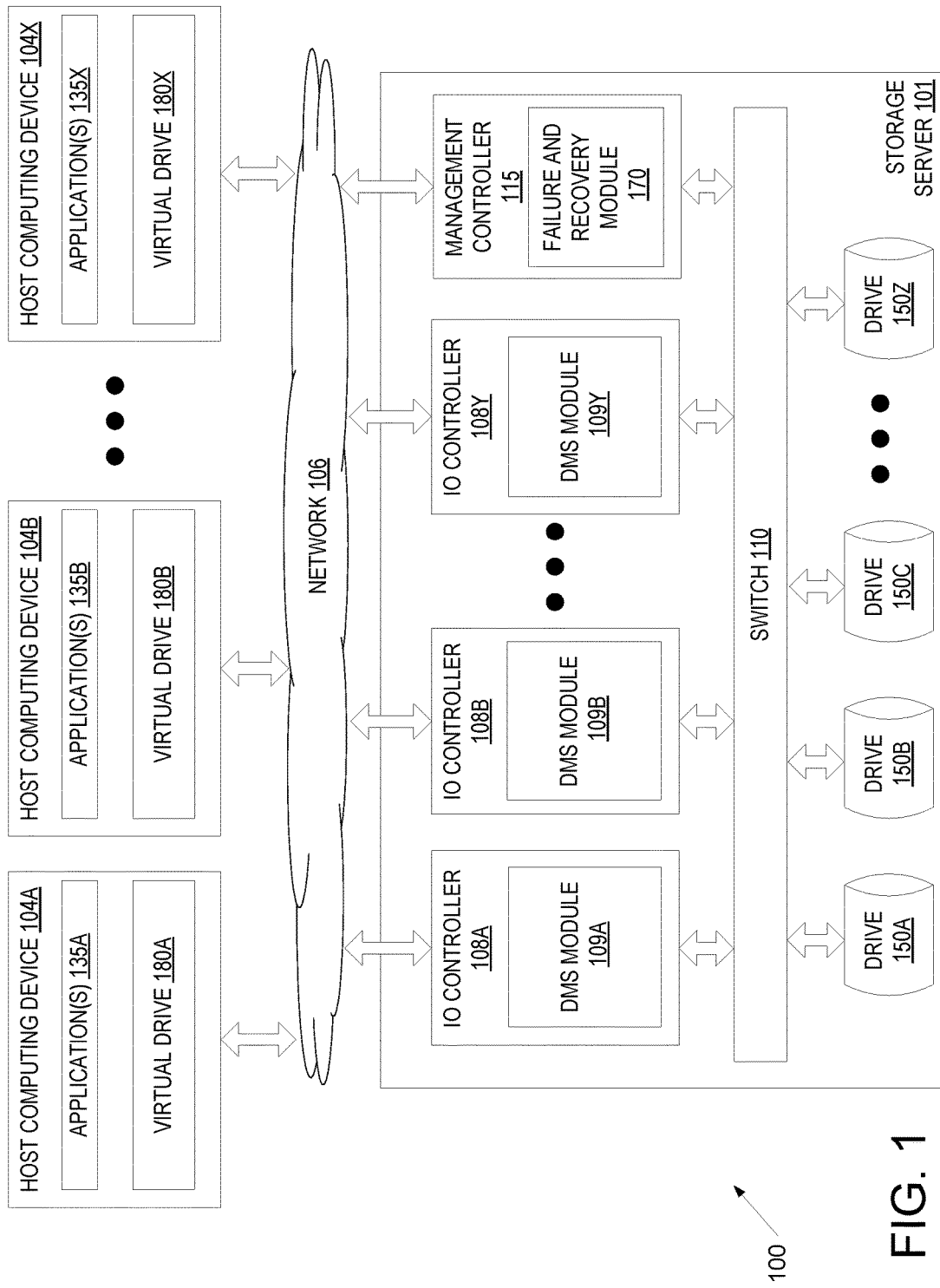
FIG. 1 is a block diagram example of a network architecture, in which embodiments described herein may operate.

Described herein are systems and methods that enable and implement a low latency metadata log referred to herein as a hybrid intent log and also as a distributed transaction log. The hybrid intent log logs metadata information for write operations. In the case of a system crash or other system failure, the metadata information from the hybrid intent log may be replayed after a system recovery to achieve a consistent state of data in storage. The hybrid intent log (distributed transaction log) is a multi-level cache having components both in volatile memory and in persistent storage.

In one embodiment, a storage server includes a first controller, a second controller and physical drives. The first controller may be an input/output (IO) controller and the second controller may be a management controller. The first controller receives a request to store data in a virtual block address (VBA) of a virtual drive. The first controller determines a physical block address (PBA) of a physical drive on which to store the data and sends to the physical drive a command to store the data at the PBA. The first controller additionally generates a first metadata update for a first metadata table associated with the virtual drive, wherein the first metadata update indicates a mapping of the VBA to the PBA. In one embodiment, the first metadata table is a virtual block address translation (VBAT) table. The first controller also generates a second metadata update for a second metadata table that identifies statuses of PBAs, wherein the second metadata update indicates that the PBA is valid. In one embodiment, the second metadata table is a global stripe table (GST). If the VBA was previously mapped to a second PBA, the first controller also generates a third metadata update for the second metadata table, wherein the third metadata update indicates that the second PBA is invalid. The first and second metadata tables contain information that maintains the consistency of the data stored on the physical drives.

The first controller writes an entry to a level one (L1) cache in a memory, the entry comprising the first metadata update and the second metadata update. The memory may be a memory of the second controller. The first controller may additionally write the cache entry to a copy of the L1 cache in an additional memory of the first controller.

When the L1 cache becomes full, the first controller may flush contents of the L1 cache to an L2 cache that is on one or more of the physical drives. Additionally, the first controller may flush the contents of the L1 cache to a first metadata table cache of the first metadata table and to a second metadata table cache of the second metadata table. The metadata table updates are written from the L1 cache to the metadata table caches asynchronous to writes to persistent storage. Specifically, the L1 and L2 cache can be utilized to remove the metadata writes from an IO core path associated with writing data from a host to persistent storage so that the metadata writes can be completed asynchronously. Accordingly, a write of data to persistent storage (in the IO core path) can be committed without first writing to persistent storage the metadata updates associated with the write of the data to the persistent storage. This reduces latency associated with writes to persistent storage to as low as 30 nanoseconds (ns). A delay in the writes to the metadata table caches enables the writes to the metadata table caches to be batched. Additionally, multiple writes may occur to the same virtual block address (VBA), where each new write to the same VBA renders previous writes to that VBA moot for the VBAT table. Accordingly, where multiple writes have occurred to a single VBA, all of the metadata updates to the VBAT table for the single VBA except for the latest write to that VBA may be discarded. This may reduce a number of storage level write operations associated with application level write commands.

Batching of metadata table updates may additionally enable a single input/output operation (e.g., a single write operation) to be used for updating multiple entries to a metadata table. A metadata table may be divided into pages that are stored in blocks of persistent storage (e.g., blocks on the physical drives). Processing logic may determine which metadata updates are directed to the same block or page of a metadata table and batch those metadata updates into a single update. The single update may then be made to the metadata table cache for that metadata table (or directly to the metadata table). This may further reduce the number of input/output operations performed to update the metadata tables and maintain data consistency.

The metadata table caches may be maintained in the memory of the first controller (e.g., of the IO controller). In the instance of a failure of the first controller, the contents of the metadata table caches may be lost. However, because the L1 cache is flushed to the L2 cache in persistent storage (e.g., on physical drives), the metadata table updates that were reflected in the metadata table caches are maintained. After recovery of the first controller (or after another controller takes over the responsibilities of the first controller), the first controller (or other controller) may replay the contents of the L2 cache to update the metadata tables.

In embodiments a copy of the L1 cache is maintained both at the IO controller and at the management controller. If the IO controller fails, then the management controller may flush its copy of the L1 cache to a third copy of the L1 cache in persistent storage (e.g., on one or more of the physical drives). If the management controller fails, then the IO controller may flush its copy of the L1 cache to the third copy of the L1 cache in the persistent storage. If an imminent power failure is detected, then the IO controller may also flush its copy of the L1 cache to persistent storage. Accordingly, contents of the L1 cache that have not yet been flushed to the L2 cache may also be preserved in various cases of system failure.

As set forth in embodiments described herein, a hybrid intent log is maintained partially in memory of one or more controllers and partially in persistent storage. Writes of metadata for a write operation may be made to an L1 cache in memory of the one or more controllers synchronous to writes of data to persistent storage. Writes of the metadata to an L2 cache in persistent storage and to metadata tables may be made asynchronously after multiple metadata writes have accumulated. The divided structure of the hybrid intent log enables data integrity to be maintained while minimizing write operations for metadata and virtually eliminating lag associated with maintaining metadata.

Embodiments are described herein that relate to a hybrid intent log in a storage server that includes one or more IO controllers, one or more management controllers and a plurality of physical drives arranged in an array. However, it should be understood that embodiments also apply to hybrid intent logs used in other storage arrangements, which may or may not lack a storage server. For example, embodiments are described with reference to an L1 cache in an IO controller of a storage server and an L2 cache on physical drives of the storage server. However, the L1 cache may be a cache in a memory of any computing device that includes a processing device that is connected to and sends write commands to a physical storage device (e.g., to a hard disk drive or solid state drive). Additionally, the L2 cache may be a cache in the physical storage device, which may not be managed by a storage server.

Furthermore, embodiments are described herein with reference to committing updates to a virtual block address translation (VBAT) table and a global stripe table (GST) atomically. However, it should be understood that the described embodiments may also be used to atomically commit other metadata table updates to multiple different metadata tables and/or to multiple different pages or blocks of a single metadata table. Accordingly, embodiments described herein apply to multi-block and/or multi-page updates to any single metadata table or any combination of metadata tables, and are not limited to the example VBAT table and GST. In example, embodiments may apply the hybrid intent log (distributed transaction log) described herein for other types of systems that would benefit from a transaction mechanism.

In an example, in embodiments the mechanisms discussed herein may be applied to file system updates to an inode. Each file in a filesystem may include an inode, and inode updates should be performed transactionally such that all of the updates to multiple pieces of information in the inode (e.g., timestamp, file location, etc.) are made together or are not made. Accordingly, the multiple updates to an inode may be added to a cache entry in the L1 cache discussed herein, and may be committed atomically as described. The handling of the cache entries that contain the inode update information may be similar to the handling of cache entries as described in further detail below (e.g., flushing to inode, flushing to L2 cache, recovery, and so on).

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 106.

Storage server 101 is a computing device that is configured and optimized to provide storage to local and/or remote computing devices (e.g., to host computing devices 104A-X, also referred to herein as client computing devices). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud service provider system. Each virtual machine offered by a cloud service provider system may be hosted on a physical machine configured as part of a cloud. Such physical machines are often located in a data center. The cloud service provider system and cloud may be provided as an infrastructure as a service (IaaS) layer. One example of such a cloud is Amazon's® Elastic Compute Cloud (EC2®).

Each host computing device 104A-X may host one or more applications 135A-X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) or volumes and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., physical drives 150A, 150B, 150C through 150Z of storage server 101) and/or to other local address spaces that are in turn mapped to the physical storage address spaces. Additionally, a virtual drive 180A-X may map a logical storage address space to physical storage address spaces of storage devices on multiple different storage servers.

Storage server 101 includes multiple input/output (IO) controllers 108A, 108B through 108Y connected to multiple drives 150A, 150B, 150C, through 150Z via a switch 110. The physical drives 150A-Z (also referred to simply as drives) may be physical storage devices such as solid state drives (SSDs) (e.g., SAS/SATA drives, non-volatile memory express (NVMe) drives, small computer system interface (SCSI) over PCIe (SOP) drives, or solid state drives that communicate using different protocols), conventional disk drives, or any other storage media. The number of drives included in storage server 101 may be less than 10 to more than 100. The drives may have the same or different storage capacities. In some implementations, the number of host computing devices 104A-X, the number of IO controllers 108A-Y, and the number of drives 150A-Z may be different from each other.

Switch 110 is a multi-port bridge that connects IO controllers 108A-Y to drives 150A-Z. Switch 110 manages the flow of data within storage server 101 by connecting specific IO controllers 108A-Y to specific drives 150A-Z on a message by message basis, allowing the switch 110 to regulate the flow of traffic. Each IO controller 108A-Y and each drive 150A-Z connected to switch 110 can be identified using a unique address (e.g., a unique port address) of the IO controller or drive. Switch 110 may be a PCIe switch, an Ethernet switch, a SAS or SATA expander, a USB switch, or other type of switch.

In embodiments, each drive 150A-Z may be a solid state drive (also referred to as a solid state storage device or SSD) that is a non-volatile storage device that uses integrated circuits to persistently store data. SSDs have numerous advantages over traditional disk drives. As compared to disk drives, SSDs are more resilient, consume less power, and have lower latency (access times). In one embodiment, drives 150A-Z are NAND-based Flash memory devices or NOR-based Flash memory devices. Flash memory devices are non-volatile and can be electronically erased and reprogrammed. Alternatively, one or more drives 150A-Z may be volatile memory-based solid state drives (e.g., dynamic random access memory (DRAM)-based SSDs) that have a battery backup. Drives 150A-Z may include one or more ports (e.g., PCIe ports) to connect to switch 110. Drives 150A-Z may connect to switch 110 via PCIe, SCSI, SAS, USB, or other connection protocols.

In embodiments where drives 150A-Z are SSDs, each drive 150A-Z may have a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, drives 150A-Z may have pages that are 4 kilobytes (kB), 8 kB, or 16 kB. However, other page sizes are also possible. SSD pages are grouped into blocks. Each block contains a particular number of pages, which is again dependent on a design of a particular SSD. Typical SSDs have blocks that include 256 pages. Conventionally an SSD may only perform a write or a read to a single page in a block at a time.

The contents of one or more metadata tables may be distributed across the drives 150A-Z, as discussed in greater detail below with reference to the following figures. When data is written to one or more of the drives 150A-Z, often multiple pages in one or more metadata tables should be updated to maintain metadata associated with the data written to the drives 150A-Z. However, multiple pages in the drives 150A-Z generally cannot be updated atomically (e.g., where all of the updates must occur or none of the updates will be performed). The hybrid intent log described herein enables multi-block and multi-page updates to be performed atomically to metadata tables that are on one or more SSDs 150A-Z.

Drives 150A-Z may be configured in an array such that logically sequential data can be segmented across the array using data striping. In some embodiments, the array may be configured such that a single stripe spans all of the drives in the array. Alternatively, the array may be configured such that a single stripe spans only a portion of the drives in the array. In this latter case, the drives in the array may be divided into media sets where a single stripe spans the drives in a media set. For example, an array with 18 drives may be configured with two media sets of 9 drives each, where a single stripe spans 9 drives of a media group. The two media sets of 9 drives may be combined to form a media group of two media sets.

Each drive used in striping can be divided into a set of stripe units. Each stripe unit of a single drive can be allocated to a different stripe and has a unique physical block address (PBA). A single stripe includes a single stripe unit from each of the drives in the stripe. For example, where a storage array of 18 drives is configured such that a single stripe spans all 18 drives, each of the 18 drives includes a stripe unit allocated to a single stripe, and each stripe includes 18 stripe units (one stripe unit for each of the drives in the stripe). In some implementations, where the drives are SSDs, a stripe unit may be the size of a page of an SSD (e.g., 4 kB, 8 kB, 16 kB, etc.). Alternatively, a stripe unit may be a block of an SSD that includes multiple SSD pages. In one embodiment, each stripe unit is identified by tuple including a stripe identifier (stripe ID) and a stripe position. The tuple of the stripe ID and the stripe position may be used as the physical block address (PBA) for a page in an SSD 150A-Z.

In embodiments, the array of drives may be configured in a particular redundant array of independent disks (RAID) configuration. Different RAID configurations may have different levels of redundancy and/or parity. In one embodiment, the drives may be configured with block level or page level striping performed across the drives with one or more dedicated parity disks (RAID 4). In an alternative embodiment, the drives may be configured where block level or page level striping is used and parity is distributed across the different drives (RAID 5). In another embodiment, the drives may be configured where block level or page level striping is used with double distributed parity that provides fault tolerance for up to two unavailable storage devices (RAID 6). In other embodiments, other RAID configurations may be utilized with varying degrees of redundancy and/or parity.

In some implementations, stripe units dedicated to parity may be distributed across the drives in a stripe. For example, as noted above, a storage array of 18 drives may be configured such that a single stripe spans all 18 drives, so each stripe includes 18 stripe units (one stripe unit for each of the drives in the stripe). In implementations where two drives are dedicated to parity in the storage array, two stripe units for each stripe may be used to store the parity information for that stripe. Thus, 16 of the 18 stripe units in each stripe may be used to store data in an example. In various embodiments, the stripe units used for parity may be in dedicated drives that are used for parity for all stripes. Alternatively, the stripe units used for parity may be spread across any of the drives in the storage array.

Each IO controller 108A-Y is a device configured to connect one or more host computing devices 104A-X to one or more drives 150A-Z. Each IO controller 108A-Y includes one or more network interface controllers (NICs) such as Ethernet NICs and/or other protocol adapters (e.g., such as FC, SAS/SATA, or Infiniband (IB) adapters) that connect that IO controller to network 106. Each IO controller 108A-Y additionally includes a port that connects to switch 110 via an internal bus. Though only a single switch 110 is shown, the IO controllers 108A-Y may include multiple ports for connecting to multiple different switches and associated fabrics.

In one embodiment, IO controllers 108A-Y include peripheral component interconnect express (PCIe) ports that connect to switch 110 via a PCIe bus. Alternatively, or additionally, IO controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. IO controllers 108A-Y may additionally include a volatile and/or non-volatile memory to store firmware and/or software for performing operations described herein. Volatile memory may also be used for a component of a hybrid intent log (e.g., for an L1 cache of a hybrid intent log). For example, IO controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.) that contains an L1 cache.

IO controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each IO controller 108A-Y is a system on a chip (SoC) including a processing device, a memory, one or more NICs and one or more internal ports.

Each IO controller 108A-Y is assigned to one or more host computing devices 104A-X, and handles input/output (IO) commands for those host computing devices. Applications 135A-X running on a host computing device 104A-X may attempt to read data from and/or write data to a virtual drive 180A-X that the host computing device 104A-X has access to (e.g., that has been presented to the host computing device 104A-X). Responsive to such a read or write request, the host computing device 104A-X sends a host command to the IO controller 208A-X that is assigned to that host computing device 204A-X to initiate the read or write operation. As used herein, a host command is an application level read or write command that originates at an application of a host computing device.

Each IO controller 108A-Y includes a data management system (DMS) module 109A-Y that handles read and write operations for the IO controller 108A-Y. The DMS module 109A-Y is responsible for ensuring that data is written to drives 150A-Z and that data consistency and integrity is maintained. The DMS module 109A-Y performs write operations with minimal latency and bandwidth utilization, while maintaining data integrity and consistency, in embodiments by maintaining a hybrid intent log, which is discussed in greater detail below with reference to the following figures.

When the IO controller 108A-Y receives an application level read or write command from the host computing device 104A-X, the DMS module 109A-Y extracts the read or write command from the message and determines what logical addresses (also referred to herein as virtual block addresses (VBAs)) of the virtual drive 180A-X should be used to write the data to or read the data from. The DMS module 109A-Y may additionally translate the logical addresses or VBAs of the virtual drive to physical addresses (also referred to as physical block addresses (PBAs)) of the drives 150A-Z. For example, if an application level read command is received, the DMS module 109A-Y may determine which drives 150A-Z store the information to be read as well as which PBAs on those drives the data should be read from. If an application level write command is received, the DMS module 109A-Y may determine one or more VBAs to write the data to, and may further determine one or more PBAs to map to the one or more VBAs. The DMS module 109A-Y may then generate one or more storage level sub-commands directed to the determined drives 150A-Z to write data to the PBAs on those drives 150A-Z or read data from the determined PBAs on those drives 150A-Z.

DMS module 109A-Y may additionally include array configuration information for the drives 150A-Z that identifies how the drives 150A-Z have been arranged into an array (e.g., that identifies a RAID configuration for the array, stripes of the array, stripe groups of the array, and so on). The array configuration information may include data structures that identify the available stripe units in the storage array that may be used for incoming application level write commands. Additionally, the array configuration information may be used to reconstruct data of one or more virtual drives 180A-X if one or more of the drives 150A-Z becomes unavailable. The drives 150A-Z may become unavailable due to a drive failure, performance degradation due to execution of a background operation (e.g., an erasure operation, storage reclamation processing such as garbage collection, etc.), or the like.

Storage server 101 additionally includes a management controller 115. Management controller 115 may be a device configured to perform particular operations with regards to management of the array of drives 150A-Z. Management controller 115 may include a processing device, a port for connecting to switch 110 and a NIC for connecting to network 106. Management controller 115 may additionally include a volatile and/or non-volatile memory to store firmware and/or software for performing operations described herein. Additionally, the memory of the management controller 115 may be used to store a portion of a hybrid intent log, such as a copy of an L1 cache for a hybrid intent log. In one embodiment, management controller 115 is a SoC.

The management controller 115 determines how to configure the array of drives 150A-Z and further determines configurations for the one or more virtual drives 180A-X. For example, management controller 115 may determine which virtual drives 180A-X map to which physical drives and which portions of those drives the virtual drives map to. Once these configurations are determined, management controller 115 may send these configurations to the IO controllers 108A-Y for implementation. Management controller 115 additionally performs discovery operations and may be responsible for pairing IO controllers 108A-Y with host computing devices 104A-X.

As discussed above, in embodiments the DMS modules 109A-Y each maintain a hybrid intent log that has components in memory of the IO controllers 108A-Y, components in memory of the management controller 115 and components in one or more of the drives 150A-Z. In one embodiment, each hybrid intent log includes a copy of an L1 cache in the management controller 115, a copy of an L1 cache in an IO controller 108A-Y and an L2 cache distributed across some or all of the drives 150A-Z. In one embodiment, DMS modules 104A-Y maintain a separate hybrid intent log for each virtual drive 180A-X for which the DMS module 109A-Y handles IO operations. For example, DMS module 109A may maintain a first hybrid intent log for virtual drive 180 and a second hybrid intent log for virtual drive 180B, and DMS module 109B may maintain a third hybrid intent log for virtual drive 180X. In the case that the management controller 115 fails, the DMS module 109A-Y may flush contents of the L1 cache to a persistent copy of the L1 cache on one or more of the drives 150A-Z.

Management controller 115 may additionally include a failure and recovery module 170 that performs operations to preserve the hybrid intent log in the case of a power failure and/or failure of an IO controller 108A-Y. If a power failure is detected, the failure and recovery module 170 may direct each DMS module 109A-Y to flush corresponding L1 caches controlled by that DMS module 109A-Y to the persistent copy of the L1 caches on the physical drives 150A-Z. If one of the IO controllers fails, the failure and recovery module 170 may flush the copy of the L1 caches that are associated with the failed IO controller and that are stored in memory of the management controller 115 to the persistent copy of the L1 caches. Failure and recovery module 170 may additionally assign an IO controller to take over and perform recovery for a failed IO controller and/or facilitate recovery of a failed IO controller.

Figure 2:
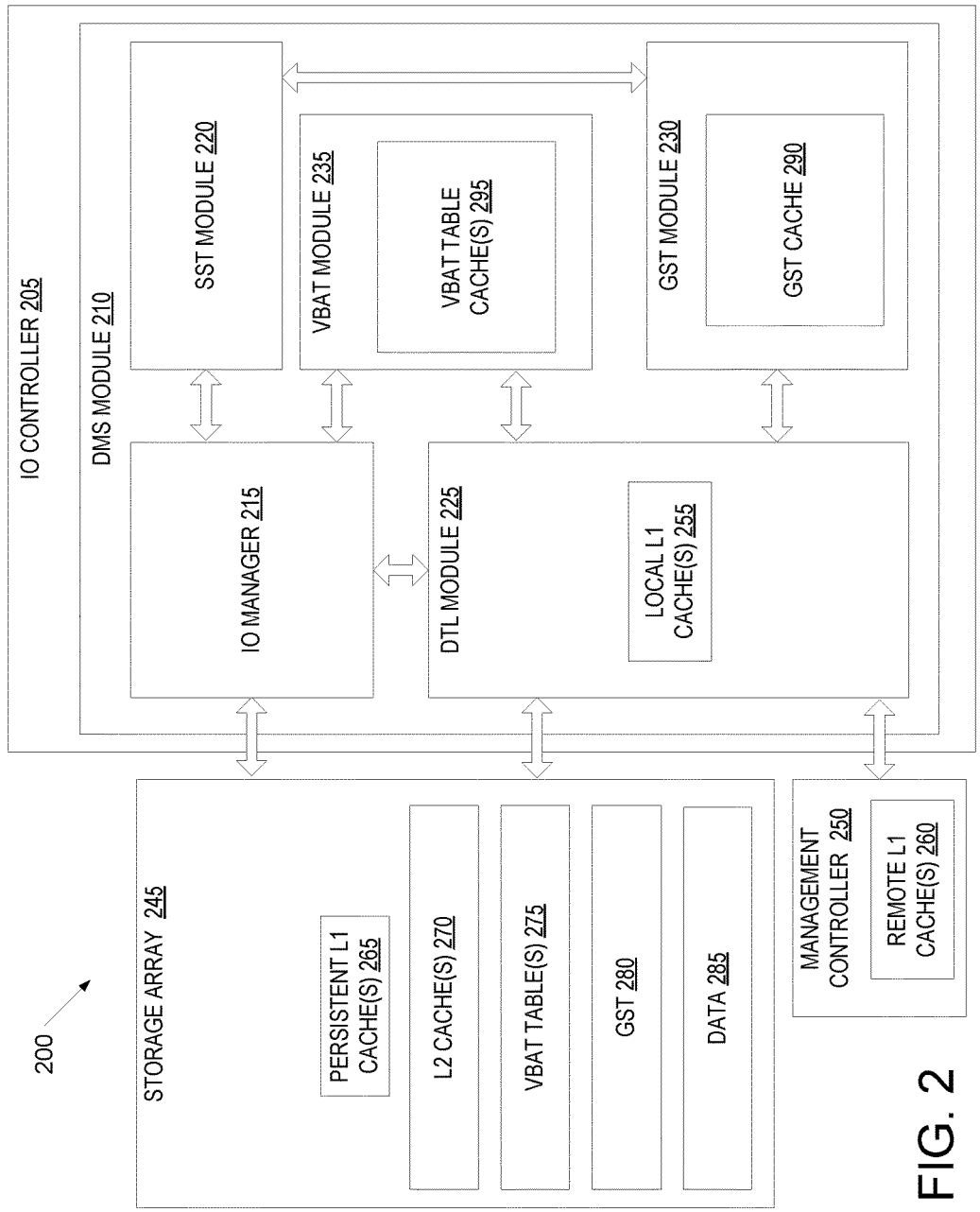
FIG. 2 is a block diagram of a storage server, in accordance with embodiments of the present invention.

FIG. 2 is a block diagram of a storage server 200, in accordance with embodiments of the present invention. The block diagram does not reflect all of the components of the storage server 200 for some embodiments, but instead only shows those components that are being described with reference to FIG. 2. The storage server 200 may correspond to storage server 101 of FIG. 1 in embodiments. As shown, the storage server 200 includes an IO controller 205, a storage array 245 that includes multiple physical drives (e.g., physical drives 150A-Z) and a management controller 250. The storage server 200 may further include additional IO controllers and/or management controllers (not shown). IO controller 205 includes a DMS module 210, which is divided into multiple different logical modules that may be loaded into and executed by a processing device of IO controller 205. Alternatively, or additionally, IO controller 205 may include one or more physical modules (e.g., an integrated circuit (IC) designed with described modules or a configurable logic such as a field programmable gate array (FPGA) configured to have the modules) that perform the functions of one or more of the DMS module's 210 components. In one embodiment, the logical and/or physical modules of the DMS module 210 include an IO manager 215, a spread space tracking (SST) module 220, a distributed transaction log (DTL) module 225, a global stripe table (GST) module 230 and a virtual block address translation (VBAT) module 235.

Storage array 245 includes multiple physical drives arranged in a striped array. Storage array 245 may include one or more persistent L1 caches 265, one or more L2 caches 270, one or more VBAT tables 275, a GST 280 and data 285 (e.g., data that has been received from a host computing device for storage) stored thereon. In one embodiment, one or more of the persistent L1 cache(s) 265, the L2 cache(s) 270, the VBAT table(s) 275 and the GST 280 are mirrored within the storage array 245. Accordingly, there may be up to three copies (e.g., an original plus two additional copies) of each of the L1 cache(s) 265, the L2 cache(s) 270, the VBAT table(s) 275 and the GST 280 in storage array 245.

SST module 220 is responsible for tracking stripe information, including available and unavailable PBAs (also referred to as stripe units) on stripes. For example, SST module 220 keeps track of which stripe units (e.g., stripe ID and stripe position tuples) are available and which stripe units are unavailable. SST module 220 maintains information that tracks the available stripe units across each of the stripes used in one or more virtual drives (also referred to as volumes) managed by the IO controller 205. SST module 220 periodically sends messages to IO manager 215 notifying IO manager 215 of available PBAs. This enables the IO manager 215 to reuse PBAs holding invalid data. Additionally, SST module 220 may identify stripes in the storage array 245 that are the "best fit" for incoming application level write requests received by IO manager 215. The identification and use of "best fit" stripes may minimize the overhead for parity calculations of stripes. In some embodiments, the SST module 220 performs spread space tracking operations as described in co-pending U.S. patent application Ser. No. 15/403,011, filed Jan. 10, 2017, which is herein incorporated by reference.

SST module 220 also performs garbage collection operations to free invalid PBAs. Garbage collection may be performed based on information from the GST 280 and/or the GST cache 290. For example, the GST 280 and/or GST cache 290 may identify PBAs that are invalid but whose contents have been used to compute current parity information. SST module 220 may reclaim such invalid PBAs by re-computing parity information for a stripe containing one or more such invalid PBAs. The recomputed parity information may be computed based on the PBAs in a stripe that are valid. Once the parity information is recomputed, the invalid PBAs may be identified to the IO manager 215 for reuse. SST module 220 may also compute parity information for stripes that contain new data for which parity has not yet been computed.

GST module 230 is responsible for maintaining a GST 280 (also referred to herein simply as a stripe table) in storage array 245 and a GST cache 290 in a memory of IO controller 205. The GST cache 290 may include recently accessed and/or updated pages of the GST 280. The GST cache 290 may contain updates to the GST 280 that have not yet been written to the GST 280. A page of the GST cache 290 and a page of the GST 280 may correspond to a page of a physical drive in the storage array 245. For example, pages of physical drives in the storage array 245 may have a size of 4 kB in embodiments. Accordingly, a page of data in the GST 280 and GST cache 290 may also contain 4 kB.

GST module 230 may periodically flush contents of the GST cache 290 to the GST 280. This may include performing multiple write operations to update multiple pages in the GST 280. As used herein, a flush operation is the transfer of data (e.g., metadata updates) from a temporary or volatile storage area (e.g., the GST cache 290 in memory of the IO controller 205) to a persistent storage (e.g., to GST 280 in storage array 245).

The GST 280 and GST cache 290 contain first information that identifies whether PBAs are valid and second information that identifies whether PBAs were used to compute parity for their corresponding stripes. Based on this information, SST module 220 may determine which PBAs to perform garbage collection operations on and for which stripes new parity information should be computed.

In embodiments, the GST 280 and GST cache 290 are independent of virtual drives. Accordingly, a single GST 280 and GST cache 290 may contain information for PBAs that are mapped to multiple different virtual drives. For example, a first PBA in the GST 280 may be mapped to a first virtual drive and a second PBA in the GST 280 may be mapped to a second virtual drive. Accordingly, virtual drive information may be irrelevant to the GST 280 and GST cache 290. In some embodiments, pages in the GST 280 and GST cache 290 include data for not more than a single virtual drive. For example, a first page may include metadata associated with PBAs used in a first virtual drive and a second page may include metadata associated with PBAs used in a second virtual drive. This may reduce the number of IO operations associated with writing to and reading from the GST 280 and GST cache 290.

Figure 7:
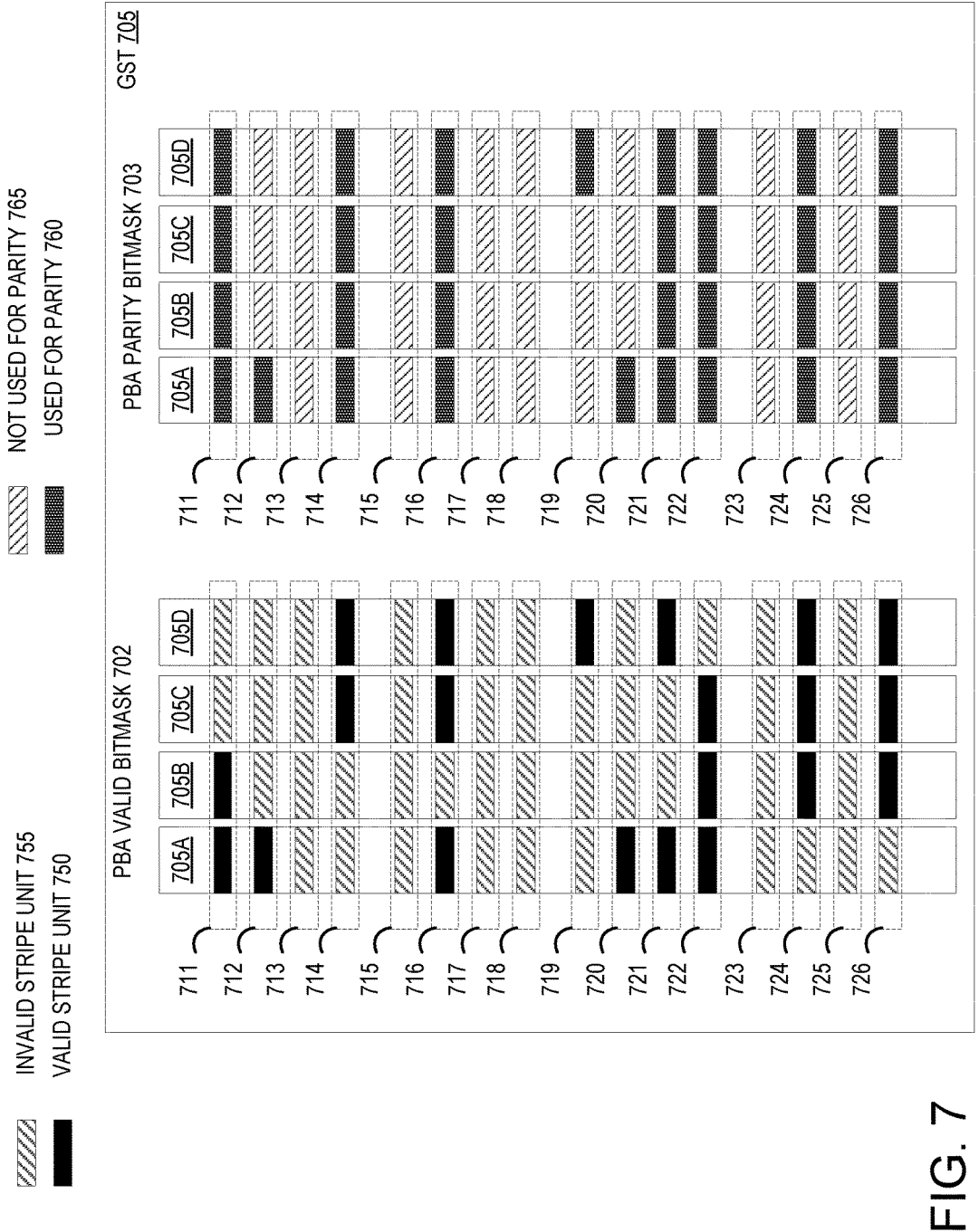
FIG. 7 is a block diagram of a global stripe table, in accordance with embodiments of the present invention.

FIG. 7 graphically illustrates an example of a portion of a GST 705. As shown, the GST 705 includes two bitmasks (also referred to as bitmaps). A first bitmask is a PBA valid bitmask 702 that indicates whether PBAs are valid 750 or invalid 755. Each row of the PBA valid bitmask 702 is associated with a particular stripe, and each bit in a row of the PBA valid bitmask 702 is associated with a stripe unit (PBA) for that stripe. Alternatively, a separate bitmap may be maintained for each stripe. Thus, a stripe that includes 18 stripe units (e.g., 18 drives) may have an associated bitmap (or a row of a bitmap) with 18 bits (1 bit per stripe unit for that stripe). Each bit in the bitmap may be set to one value to indicate a valid stripe unit (e.g., a stripe unit that contains valid data), and to a different value to indicate in invalid stripe unit. For example, a bit value of '0' may indicate an invalid PBA and a bit value of '1' may indicate a valid PBA. Alternatively, other values may be used.

A second bitmask is a PBA parity bitmask 703 that indicates whether PBAs have been used to compute the parity for a stripe 765 or have not been used to compute parity for a stripe 760. Each row of the PBA parity bitmask 703 is associated with a particular stripe, and each bit in a row of the PBA parity bitmask 703 is associated with a stripe unit (PBA) for that stripe. Alternatively, a separate bitmap may be maintained for each stripe. Thus, a stripe that includes 18 stripe units (e.g., 18 drives) may have an associated bitmap (or a row of a bitmap) with 18 bits (1 bit per stripe unit for that stripe). Each bit in the bitmap may be set to one value to indicate that a stripe unit has been used to compute parity, and to a different value to indicate that the stripe unit has not been used to compute the parity. For example, a bit value of '0' may indicate that a PBA was not used to compute parity for a stripe and a bit value of '1' may indicate a PBA was used to compute parity for a stripe. Alternatively, other values may be used.

As shown in the example of the portion of the GST 705, a storage array includes four drives 705A-D. Each of drives 705A-D includes 16 total stripe units. The Storage array is configured with 16 total stripes 711-726. Each page of the GST 705 (and associated GST cache) may hold PBA valid bitmask information and PBA parity bitmask information for a finite number of stripes, depending on the number of drives per stripe. Each page of the GST 705 may additionally include other information such as a universally unique identifier (UUID) of the page, an identifier of a particular virtual drive associated with the page, a checksum for the page, and so on. In embodiments, the GST 705 contains information for PBAs that are mapped to multiple different virtual drives. However, in one embodiment each page of the GST 705 contains PBAs that are used by a single virtual drive. Accordingly, all of the PBAs in a page of the GST 705 may be associated with the same virtual drive.

Stripe units (PBAs) in the storage array may be invalid and not used for parity, invalid and used for parity, valid and not used for parity or valid and used for parity. For example, a write command may be received for a VBA that was previously mapped to a first PBA, and that first PBA may have been used to compute a parity for a stripe. As a result of the write command, the VBA may be mapped to a new PBA and the first PBA may become invalid. However, new parity information may not be immediately computed when the PBA becomes invalid. Accordingly, the first PBA should not be overwritten and is not yet free because doing so would defeat any effort to reconstruct data of still valid PBAs in the stripe using the parity for that stripe. Additionally, new data may be written to a PBA in a stripe, and a new parity may not yet be computed for that stripe. Accordingly, but the PBA valid bitmask 702 information and the PBA parity bitmask 703 information is used in determining which PBAs to free.

As noted above, an available stripe unit may be a PBA in the storage array that is available to be used to satisfy a write request. Meaning, the stripe unit or PBA may be space in a stripe on one of the drives in the storage array to which data may be written. The stripe unit may be available because no data has been written to that stripe unit. Alternatively, the stripe unit may be available because data that was previously written to that stripe unit was later rewritten. SSDs apply log structured storage principles, so when data is overwritten in implementations where the drives are SSDs, the stripe unit that originally stored the data is invalidated and the modified data is written to a new stripe unit. Once a stripe unit (e.g., a memory page) is invalidated and is no longer used for computation of a stripe's parity, it may become available to store new data.

Although for simplicity FIG. 7 depicts a particular configuration of a GST 705, it should be noted that embodiments described herein can operate on other configurations that include more or fewer drives, more or fewer stripes, more or fewer stripe units in a stripe, more or fewer stripe groups, and/or more or fewer stripes in each stripe group.

Returning back to FIG. 2, VBAT module 235 is responsible for maintaining a VBAT table 275 in the storage array 245 and a VBAT table cache 295 in a memory of the IO controller 205. The VBAT table 275 and VBAT table cache 295 contain entries that map virtual block addresses of a virtual drive to physical block addresses (e.g., as expressed using tuples of stripe ID and stripe position). A separate VBAT table 275 and VBAT table cache 295 may be maintained for each virtual drive handled by IO controller 205. For each VBA in a particular virtual drive, VBAT table 275 contains an entry that maps that VBA to a PBA in the storage array 245.

The VBAT table cache 295 may include recently accessed and/or updated pages of the VBAT table 275. The VBAT table cache 295 may contain updates to the VBAT table 275 that have not yet been written to the VBAT table 275. A page of the VBAT table cache 295 and a page of the VBAT table 275 may correspond to a page of a physical drive in the storage array 245. For example, pages of physical drives in the storage array 245 may have a size of 4 kB in embodiments. Accordingly, a page of data in the VBAT table 275 and VBAT table cache 295 may also contain 4 kB.

FIG. 6 illustrates a portion of an example VBAT table 605. Each page of the VBAT table 605 may include entries for multiple virtual block addresses (e.g., for VBAs 620A-620Y). Each entry may indicate a VBA 620A-Y and a corresponding PBA 630A-C. If a VBA has not yet been mapped to a PBA (e.g., no data has yet been stored at a VBA), then the corresponding entry for the PBA associated with that VBA may have a value of 0. For example, VBA 620D is mapped to a PBA of 0000. Each page of the VBAT table 605 may additionally include other information such as a universally unique identifier (UUID) of the page, a checksum for the page, and so on.

Referring back to FIG. 2, VBAT module 235 may periodically flush contents of the VBAT table cache 295 to the VBAT table 275. This may include performing multiple write operations to update multiple pages in the VBAT table 275.

IO manager 215 is responsible for communicating with host computing devices and satisfying input/output (IO) commands such as read commands and write commands from the host computing devices. IO controller 205 receives requests from host computing devices. The requests may be, for example, application level read commands or write commands encapsulated as Ethernet packets. A received request may indicate whether the request is for a read command or a write command, and may indicate one or more virtual block addresses associated with the read command or write command. The one or more virtual addresses may be identified, for example, by an offset in the virtual drive and a length of data to be read or written.

Responsive to receipt of an application level read command, IO manager 215 identifies one or more virtual block addresses (VBAs) of a virtual storage device (e.g., a virtual NVMe drive) from which data is to be read. For example, the payload the read command may identify a particular VBA and a length. IO manager 215 may access a VBAT table 275 or VBAT table cache 295 maintained by the VBAT module 235 to determine one or more PBAs mapped to the one or more VBAs (e.g., may determine what locations (e.g., what SSD pages) on the drives that correspond to the VBAs of the virtual drives. IO manager 215 may then generate storage level read commands for each of the physical drives storing data to be read. IO manager 215 may read the data from the PBAs via the storage level read commands and may then send the data to a host from which the application level read command was received.

Responsive to receipt of an application level write command, IO manager 215 identifies one or more VBAs to write the data to and/or a length of data to be written. IO manager 215 may periodically receive lists of available PBAs and/or of stripes with available PBAs from SST module 220. IO manager 215 may determine one or more PBAs to allocate for a received application level write command using the available PBAs and/or stripes identified by the SST module 220. If there are insufficient available PBAs and/or stripes, IO manager 215 may query SST module 220 for a new list of available PBAs and/or stripes. For example, IO manager 215 may invoke SST module 220 to identify available PBAs and/or stripes with a suitable number of available PBAs.

IO manager 215 accordingly determines one or more PBAs to write the data to and generates updates to the VBAT table to map the one or more VBAs to the one or more PBAs. The PBAs may be selected from a list or other data structure of available PBAs previously provided to the IO manager 215 by the SST module 220.

IO manager 215 may then generate storage level write commands for each of the physical drives to which the data will be written, where the storage level write commands may each be directed to a different PBA or stripe unit. Accordingly, if the drives are SSDs and the stripe units are each a memory page, then each write command may be to a single memory page in an SSD. The drives receive the write commands and write the data in the commands to the specified locations (e.g., to the PBAs). The drives then each return a completion notification. These completion notifications may be added to an IO completion queue. Once completion notifications have been received from each of the drives to which data was written, IO manager 215 could generate a response to the application level write command that encapsulates a completion notification.

In embodiments IO manager 215 waits to generate a completion notification response to an application level write command until multiple metadata updates associated with the application level write command are committed by the DTL module 225, as described in greater detail below. Once the IO manager 215 receives notices from the DTL module 225 that multiple metadata updates associated with a write to a single PBA are committed and a notice from a physical drive in the storage array that the data has been written to that PBA, then the IO manager 215 may determine that the data has been successfully written to the PBA. A single host write command may include more data than fits in a single page in the storage array 245, which results in multiple write commands being sent to the storage array 245 to satisfy the host write command. In such a situation, the IO manager 215 may wait until commit notices are received from DTL module 225 and write success notices are received from storage array 245 for each of the multiple write commands that were sent to the storage array 245 before generating the completion notification and sending a response to the host that includes the completion notification to the application level write command.

DTL module 225 is responsible for maintaining a hybrid intent log, which is also referred to herein as a distributed transaction log. The hybrid intent log has multiple components distributed across persistent storage and volatile memory, including a local level 1 (L1) cache 255 maintained in a memory of the IO controller 205, a remote L1 cache 260 maintained in a memory of management controller 250, a persistent L1 cache 265 maintained in the storage array 245 and a level 2 (L2) cache maintained in the storage array 245.

In one embodiment, DTL module 225 maintains a distinct hybrid intent log for each virtual drive handled by the IO controller 205 (e.g., for each virtual drive mounted to hosts served by the IO controller 205). Each hybrid intent log may include a distinct local L1 cache 255, remote L1 cache 260, persistent L1 cache 265 and L2 cache 270.

When IO manager 215 performs writes of data 285 to PBAs in physical drives of storage array 245, the IO manager 215 sends information about those writes to DTL module 225. The information about a write of data 285 to storage array 245 may include a VBA (or VBAs) and one or more PBAs to which the data will be written. Responsive to receipt of the information about the storage level write operation associated with a VBA and PBA, DTL module 225 generates a first metadata update for the VBAT table 275 that maps the VBA to the PBA.

Responsive to a storage level write command associated with a VBA and a PBA, DTL module 225 also generates a second metadata update for the GST 280 indicating that the PBA is valid. This update may be setting a bit associated with the PBA in a PBA valid bitmask. Additionally, DTL module 225 also performs a search on the VBAT table cache 295 and/or VBAT table 275 for the identified VBA to determine whether the VBA was already mapped to a PBA prior to the current write operation. For example, DTL module 225 may query VBAT module 235 for such information. If the VBA is not mapped to any PBA (e.g., the entry for the VBA in the VBAT table 275 has only zeros for the associated PBA), then that means that the write command is a first write to a new VBA. If the VBA was already mapped to another PBA, then that other PBA will be invalidated in association with the write command. In such an instance, DTL module 225 generates a third metadata update to the VBAT table 275 to indicate that the other PBA to which the VBA had previously been mapped is now invalid. The third metadata update may be an update to unset a bit associated with the other PBA in the PBA valid bitmask. In one embodiment, DTL module 225 provides a "set and fetch" API that IO manager 215 can call to associate a VBA to a new PBA and determine whether that VBA was previously mapped to another PBA.

For a storage level write command, DTL module 225 generates a single cache entry in the L1 cache that includes all of the metadata updates associated with a storage level write operation (e.g., all of the metadata updates associated with writing data to a single VBA that represents a page of data such as a 4 kB page of data). In one embodiment, a cache entry is 16 bytes of information. Alternatively, cache entries may have different sizes. In an example, a write operation to a VBA may include the first metadata update to the VBAT table and the second metadata update to the GST if the VBA did not previously contain data. In another example, a write operation to a VBA may include the first metadata update to the VBAT table, the second metadata update to the GST and the third metadata update to the GST if the VBA previously contained data.

Figure 4A:
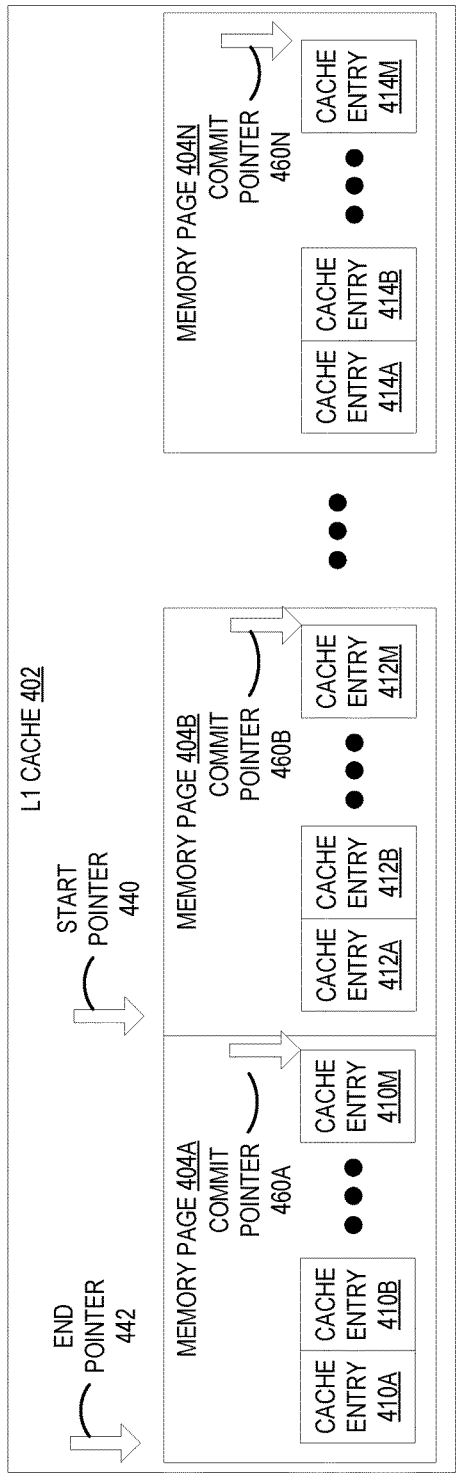
FIG. 4A is a block diagram of an L1 cache, in accordance with embodiments of the present invention.

FIG. 4A illustrates an example L1 cache 402 that includes memory pages 404A, 404B through 404N. The L1 cache 402 may be a cyclical cache. Accordingly, the L1 cache 402 may include a start pointer 440 that identifies a starting memory page in the L1 cache 402 and an end pointer 442 that identifies a last memory page in the L1 cache 402. In the illustrated example, the start pointer 440 is pointing to memory page 404B and the end pointer 442 is pointing to memory page 404A.

As shown, each memory page 404A-N includes multiple cache entries 410A-M, 412A-M, 414A-M. In one example each memory page is 4 kB and holds 180 cache entries. However, memory pages may also be other sizes, such as 8 kB, 16 kB, 32 kB, and so on. Additionally, more or fewer cache entries may be contained within each memory page 404A-N.

Each cache entry 414A-M includes the information for multiple metadata table updates associated with a storage level write command, and may be considered as a transaction object. For example, a single storage level write operation may be considered as a simple transaction that includes a first write of data to storage, a second write of first metadata to a first metadata table, a third write of second metadata to a second metadata table and/or a fourth write of third metadata to the second metadata table. In the examples discussed above, a cache entry may include a first metadata update to a VBAT table, a second metadata update to a GST and optionally a third metadata update to the GST.

Each memory page 404A-N may include a commit pointer 460A, 460B though 460N. The commit pointer 460A-N may be part of a page header for the corresponding memory page 404A-N. The commit pointer 460A-N indicates whether the metadata updates of a particular cache entry 410A-414M have been committed. After a cache entry (e.g., cache entry 410M) is written to a memory page (e.g., memory page 404A) in the L1 cache 402 (e.g., to both a remote L1 cache and a local L1 cache), then a commit pointer (e.g., commit pointer 460A) is incremented to commit that cache entry. All of the metadata updates associated with a write operation to a PBA are included in a single cache entry. Accordingly, if that cache entry is committed, then all of the metadata updates included in that cache entry are committed atomically. Thus, all of the related metadata updates included in a cache entry are committed atomically (e.g., as a transaction that satisfies the ACID properties of atomicity, consistency, isolation and durability) by incrementing the commit pointer.

The metadata table updates may be updates to multiple different blocks and/or pages in one or more metadata tables (referred to as a multi-block update or multi-page update). However, physical drives such as solid state storage devices (SSDs) are generally only capable of updating a single page in a block at a time. Accordingly, physical drives are generally not capable of atomically committing metadata table updates to multiple blocks or pages of one or more metadata tables stored on those physical drives. However, embodiments enable multi-block and multi-page updates that will update multiple pages and/or blocks of one or more physical drives to be committed atomically. Accordingly, embodiments provide considerable improvements in data consistency.

In an example, a first metadata update to a VBAT table and a second metadata update to a GST may be generated in association with a write of data to the storage array, where the first metadata update assigns a new PBA to a VBA and the second metadata update marks the new PBA as valid. If the first and second metadata updates were not committed atomically (e.g., as a transactional update), then data may be lost and/or corrupted in the case of a failure.

Consider the case in which the VBAT update assigning a new PBA to a particular VBA is performed, and then a crash occurs before the GST update that marks the new PBA as valid is performed. On recovery processing logic would see that the new PBA is invalid and may reuse that PBA for another write operation. A later read to the particular VBA would then return the wrong data.

Consider now the case in which the GST update that marks the new PBA as valid is performed, and then a crash occurs before the VBAT table update assigning the new PBA to a VBA is performed. On recovery processing logic would no longer be able to reclaim the new PBA because the GST marks that PBA as valid. This would lead to a space leak because the VBAT table was never updated and the PBA is not used. By making the updates to the VBAT table and GST transactional (atomic), both of these problems can be prevented.

In another example, a VBA may be mapped to a first PBA and a new write may cause the VBA to be mapped to a second PBA. This new write may cause a first metadata update to the GST and a second metadata update to the GST to be generated, where the first metadata update marks the first PBA as invalid and the second metadata update marks the second PBA as valid. These two metadata updates should be atomic or else space could be leaked if old data is not reflected after a system crash.

In some embodiments it may be beneficial to commit multiple different storage level IO operations (e.g., read and/or write operations to satisfy read and/or write commands) and/or application level IO operations atomically as a transaction. Accordingly, the DTL module 225 may generate transaction objects that contain cache entries associated with multiple different application level and/or storage level IO operations. All of the metadata updates and/or other updates represented in a transaction object 520 may then be committed atomically so that all of the updates occur together or none of the updates occur.

FIG. 5 illustrates an example memory page 505 of an L1 cache, where the memory page 505 includes a transaction object 520. The memory page 505 includes standard cache entries 510A-B, where each of these cache entries includes multiple metadata updates to one or more metadata tables (e.g., updates to the VBAT table and/or GST). Additionally, the memory plate 505 includes transaction object 520, which encapsulates cache entries 510C-F. Each of cache entries 510C-F contains one or more metadata updates. For example, cache entry 510C may contain a first set of metadata updates associated with a first storage level write operation, cache entry 510D may contain a second set of metadata updates associated with a second storage level write operation, and so on. Metadata updates included in one or more of the cache entries may additionally be associated with delete operations, read operations, computation operations, and/or other types of operations. In one example, a transaction object may be associated with a data deduplication operation that includes calculating a digital fingerprint of a piece of data, searching a storage array for other copies of the same data using the digital fingerprint, and replacing those other copies of the data with pointers to the piece of data. In such an example, a transaction object may contain cache entries for each of these sub-operations. Transaction objects may have various sizes based on the number of cache entries included in the transaction objects and/or on the number of sub-operations represented in the transaction object.

As shown in memory page 505, a commit pointer 515 is pointed to an end of cache entry 510B, indicating that cache entries 510A-B are committed. However, transaction object 520 has not yet been committed in this example. Once all of the cache entries 510C-F have been successfully written to the L1 cache (e.g., to both the remote L1 cache and the local L1 cache), then the commit pointer 515 will be moved to the end of the transaction object 520 to indicate that all of the cache entries 510C-F in the transaction object have been committed. The commit pointer may be, for example, a 64 bit pointer, and updating of the commit pointer may be a single atomic operation. Accordingly, even though many updates are included in the transaction object 520, all of these updates may be committed atomically since the transaction object 520 (and all of the cache entries in the transaction object) are committed by updating the single commit pointer 515.

In one example, an application level write operation may contain more data than will fit on a single page within a physical drive on the storage array. That application level write operation may be divided into multiple different storage level write operations, where each of the storage level write operations is for storage of a single page of data on a PBA of the storage array. For example, a host write command to write 16 kB of data may be divided into four 4 kB storage level write commands. Each of those four storage level write commands may include a first metadata update to the VBAT table, a second metadata update to the GST and optionally a third metadata update to the GST. A separate cache entry may be generated for each of the storage level write commands. The cache entries for those four storage level write commands may be encapsulated in the transaction object 520. Alternatively, a single large cache entry (not shown) may include the metadata updates for each of the storage level write commands. For example, a single cache entry for the above example may include four metadata table updates to the VBAT table and four to eight metadata table updates to the GST.

Referring back to FIG. 2, in one embodiment a region in the memory of management controller 250 that is allocated for the remote L1 cache(s) 260 is mapped to a virtual address space of IO controller 205. Specifically, the region in the memory of the management controller 250 may be input/output mapped memory that is in the virtual address space of the IO controller 205. As a result, the region of memory of the management controller 250 is mapped to a virtual address space of the IO controller 205 and the IO controller 205 views this area of memory as being local memory of the IO controller 205. Accordingly, IO controller 205 makes writes to and reads from the remote L1 cache 260 as though the remote L1 cache 260 were in a memory of the IO controller 205.

DTL module 210 may maintain two copies of the L1 cache(s) in memory, where one copy is the remote L1 cache 260 in management controller 250 memory and another copy is the local L1 cache 255 in IO controller 205 memory. In one embodiment, when a new cache entry is generated DTL module 210 first writes that cache entry to the appropriate remote L1 cache 260. DTL module 225 then writes a copy of the cache entry to local L1 cache 255. Alternatively, DTL module 225 may first write to the local L1 cache 255 and then to the remote L1 cache 260. In some instances it may be preferable to first write to the remote L1 cache in case the IO controller 205 crashes between writing of the cache entry to remote L1 cache 260 and the local L1 cache 255. This may enable the management controller 250 to then take over and commit the write operation after such a failure of the IO controller 205. Once both copies of the cache entry have been written to the L1 cache for a write operation, then DTL module 225 sends a commit notice to IO manager 215.

If the L1 cache is full when a write to the L1 cache is attempted, then DTL module 225 may pause or park the write to the L1 cache and flush the L1 cache to the L2 cache 270 in the storage array 245. Additionally, updates in cache entries in the L1 cache may be made to the VBAT table cache 295 and GST cache 290 in parallel to flushing the L1 cache to the L2 cache. Accordingly, an L1 cache may be flushed both to the associated L2 cache and to the associated VBAT table cache 295 (that are all associated with the same virtual drive) and the GST cache 290 when the L1 cache becomes full. Once the flush of the L1 cache is complete, the write to the L1 cache may be resumed.

Numerous efficiency improvements are achieved by asynchronously flushing contents of the L1 cache to the VBAT table cache 295 and GST cache 290. Often file systems are overlaid on the virtual drives at a higher level of abstraction. A result of this is for updates to data to be collocated, in which many writes affect the same VBAs and/or the same pages in the VBAT table 275 and/or the GST 280 by virtue of locality of writes made by an application running on a host. Even in the case that a file system is not overlaid on top of the virtual drive, VBAs may still be reused and/or the same pages of the GST 280 and/or VBAT table 275 may be affected by multiple metadata updates. Accordingly, by delaying the time at which updates are made to the VBAT table 275 (or VBAT table cache 295) and the GST 280 (or the GST cache 290), updates to these tables and/or caches can be batched. Batching an update to a page in the VBAT table cache 295 or GST cache 290 may include identifying those metadata updates that will affect the same page and then performing a single write operation to make all of the identified updates for that page. In one embodiment, each page of the L1 cache includes 180 cache entries and the L1 cache contains multiple pages (e.g., 4-10 pages). Accordingly, seven hundred twenty or more metadata updates may be batched into updates to the VBAT table cache 295 and the GST cache 290. The batching may reduce the number of IO operations to the metadata table caches by a factor of 2 to a factor of 20 or more depending on the data. In other words, use of the L1 and L2 caches enables metadata write operations associated with a data write operation to be delayed and batched, resulting in a reduced number of input/output operations per second (IOPS). Moreover, if multiple writes were made to the same VBA, then all but the latest metadata table update for that VBA in the VBAT table cache 295 may be discarded since each new write to a VBA replaces the PBA previously mapped to that VBA with a new PBA. This can further reduce the number of IO operations that are performed to maintain metadata.

Figure 4B:
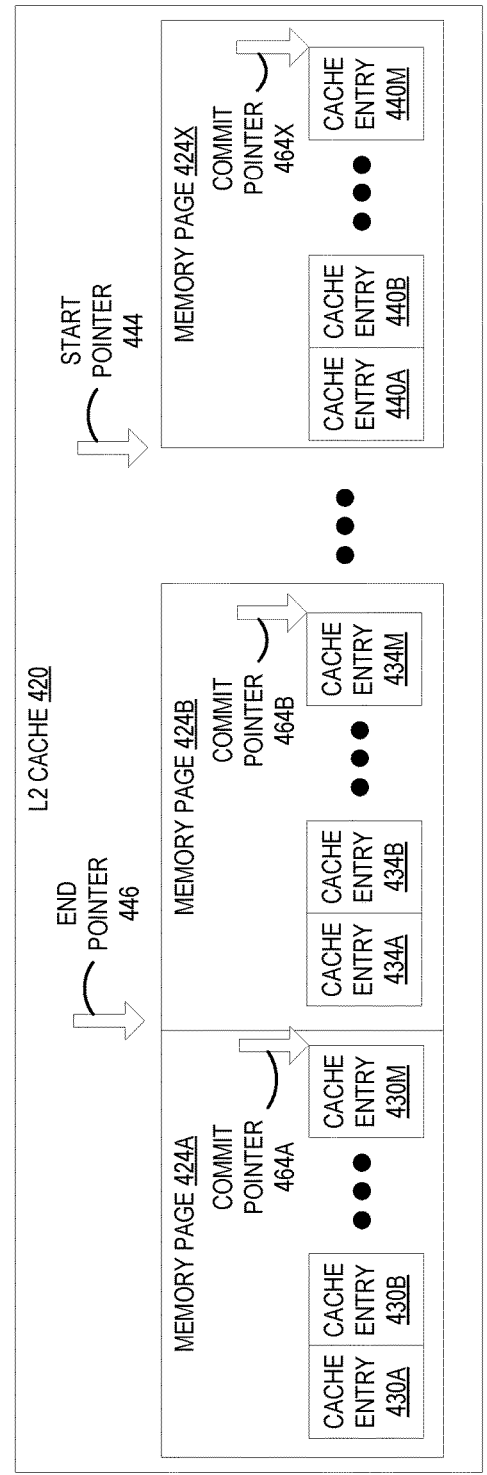
FIG. 4B is a block diagram of an L2 cache, in accordance with embodiments of the present invention.

The L2 cache 270 is conceptually similar to the L1 cache, but is located in persistent storage and is larger than the L1 cache. FIG. 4B illustrates one example of an L2 cache 420 that includes memory pages 424A, 424B through 424N. The L2 cache 420 may be a cyclical cache like the L1 cache. Accordingly, the L2 cache 420 may include a start pointer 444 that identifies a starting memory page in the L2 cache 420 and an end pointer 448 that identifies a last memory page in the L2 cache 420. In the illustrated example, the start pointer 444 is pointing to memory page 424X and the end pointer 446 is pointing to memory page 424B.

As shown, each memory page 404A-N includes multiple cache entries 430A-M, 434A-M, 440A-M. In one example each memory page is 4 kB and holds 180 cache entries. However, memory pages may also be other sizes, such as 8 kB, 16 kB, 32 kB, and so on. Additionally, more or fewer cache entries may be contained within each memory page 424A-X.

Each memory page 424A-X may include a commit pointer 464A, 464B though 464X. The commit pointer 464A-X may be part of a page header for the corresponding memory page 424A-X. The commit pointer 464A-X indicates whether the metadata updates of a particular cache entry 440A-M have been committed.

In some embodiments the L2 cache has a variable size. The L2 cache may grow as additional data is written to the L2 cache. In one embodiment, the L2 cache for a virtual drive can grow to a maximum size of 1 GB. Alternatively, the L2 cache can grow to other sizes that may be larger or smaller than 1 GB.

Referring back to FIG. 2, if any type of system failure occurs, such as a power failure, a failure of the IO controller 205 or a failure of the management controller 250, then the local L1 cache(s) 255 or remote L1 cache(s) 260 are flushed to the persistent L1 cache(s) 265 in the storage array 245. The persistent L1 cache(s) may otherwise remain empty unless and until a failure occurs. In the example of a failure for the management controller 250, DTL module 225 may flush the local L1 cache(s) 255 to persistent L1 cache(s) 265. In the example of a failure for the IO controller 205, management controller 250 may flush the remote L1 cache(s) 260 to persistent L1 cache(s) 265. In the example of a power failure, management controller 250 may detect such a power failure and may send a command to IO controller 205 that causes DTL module 225 to flush remote L1 cache(s) 260 or local L1 cache(s) 255 to persistent L1 cache(s) 265. The storage server 200 may include a battery backup that provides enough time for all IO controller to flush their L1 caches to corresponding persistent L1 caches before the battery backup runs out of power. In some rare occurrences the management controller 250 and IO controller 205 may both fail at exactly the same time. To address such rare occurrences, management controller 250 may include a battery backed memory. Accordingly, the contents of remote L1 cache(s) 260 may not be lost when management controller 250 crashes. In embodiments the contents of the L1 cache(s) are not lost under any failure conditions.

Figure 3:
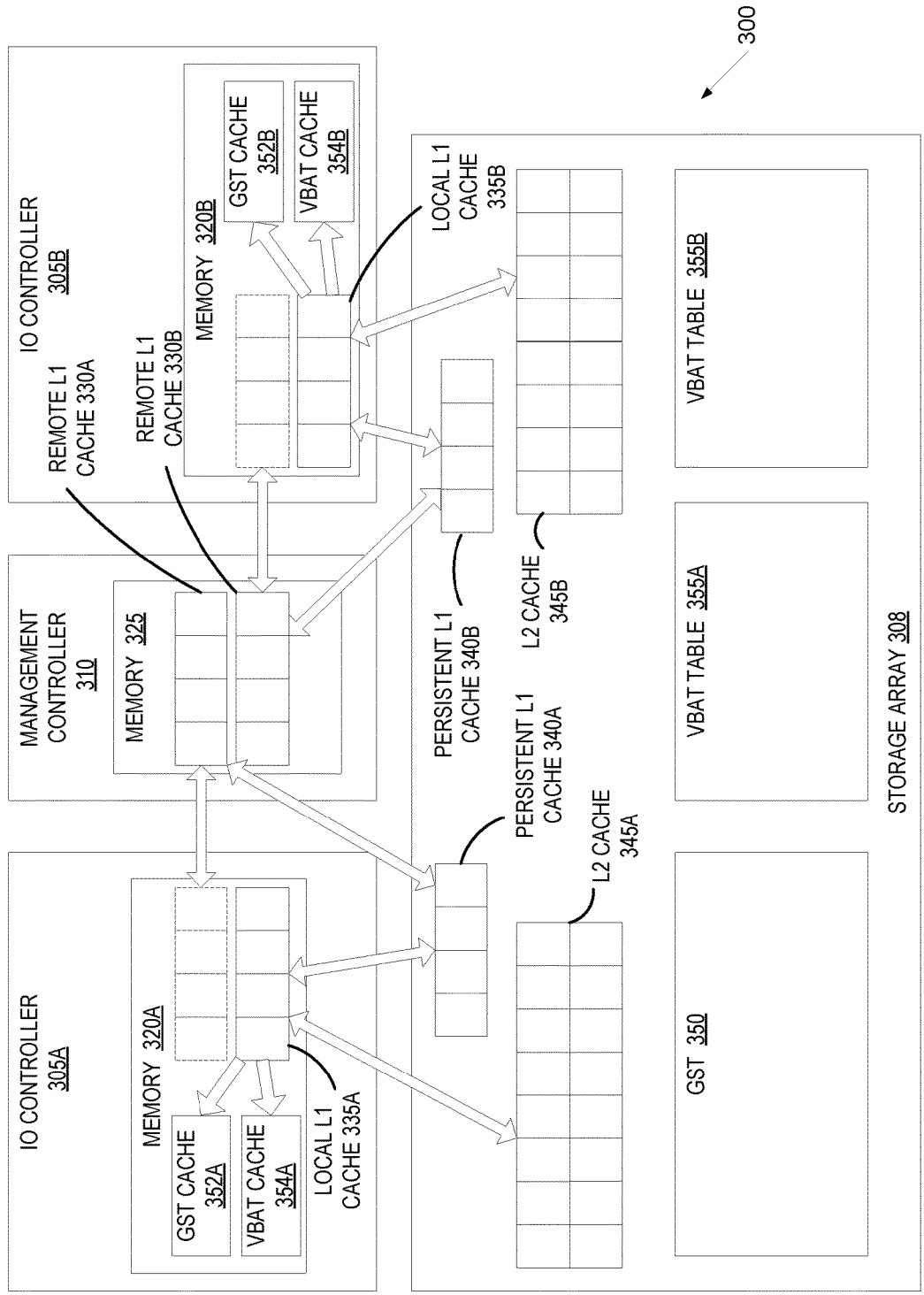
FIG. 3 is another block diagram of a storage server, in accordance with embodiments of the present invention.

FIG. 3 is another block diagram of a storage server 300, in accordance with embodiments of the present invention. FIG. 3 illustrates the different portions of a first hybrid intent log for a first virtual device, which includes a remote L1 cache 330A in a memory 325 of management controller 310, a local L1 cache 335A in a memory 320A of IO controller 305A, a persistent L1 cache 340A in storage array 308 and an L2 cache 345A in the storage array 308. FIG. 3 further illustrates the different portions of a second hybrid intent log for a second virtual device, which includes a remote L1 cache 330B in memory 325 of management controller 310, a local L1 cache 335B in a memory 320B of IO controller 305B, a persistent L1 cache 340B in storage array 308 and an L2 cache 345B in the storage array 308. Also illustrated are a GST 350 in storage array 308, a GST cache 352A in memory 320A and a GST cache 352B in memory 320B.

Also illustrated are a VBAT table 355A in storage array 308, a VBAT table cache 354A in memory 320A for the VBAT table 355A, a VBAT table 355B in storage array 308 and a VBAT table cache 354B in memory 320B for the VBAT table 355B.

The memory 325 of the management controller 310 may be divided up into regions or areas, and each of these regions or areas may be allocated for a different remote L1 cache. For example, a first region of memory 325 is allocated for remote L1 cache 330A and is mapped to a virtual address space of IO controller 305A and a second region of memory 325 is allocated for remote L1 cache 330B and is mapped to a virtual address space of IO controller 305B. The remote L1 caches 330A-B may be a same size as the local L1 caches 335A-B and the persistent L1 caches 340A-B. In one embodiment, each of the L1 caches is 4 MB, and is divided into 4 kB pages. Accordingly, each L1 cache may contain up to 1024 pages in an embodiment. Alternatively, the L1 caches may be larger or smaller than 4 MB and/or the pages may be larger or smaller than 4 kB.

In one embodiment, one or a few pages of an area of the memory allocated for multiple L1 caches is used as a superblock. The superblock contains information on which virtual drives (volumes) have been registered to an IO controller 305A-B and are being managed by that IO controller 305A-B. Additionally, multiple different local L1 caches 335A-B and remote L1 caches 330A-B may be used for management of multiple different virtual drives. In one embodiment, each virtual drive managed by an IO controller 305A is allocated one or more pages that constitute the L1 cache for that virtual drive. The number of pages allocated to a virtual drive may depend on the size of the pages, the size of the memory dedicated for use in the L1 caches and the number of virtual drives managed by an IO controller. If an IO controller supports 100 virtual drives, the pages are 4 kB and 4 MB is to be divided among the L1 caches on the IO controller, then around 10 pages may be allocated to each virtual drive, for example. The superblock may contain information indicating which pages are allocated for which L1 cache. For example, a first page may be allocated to a first L1 cache for a first virtual drive and a second page may be allocated to a second L1 cache for a second virtual drive.

Each L1 cache may be a circular log. The superblock may additionally include start pointers (e.g., a start page identifier (ID)) and end pointers (e.g., an end page ID) for each set of memory pages allocated to an L1 cache for a virtual drive. For example, a first start and end pointer may be associated with a first L1 cache, a second start and end pointer may be associated with a second L1 cache, and so on.

In one embodiment, each L1 cache contains its own superblock. FIG. 4C is a block diagram of a superblock 475 for an L1 cache, in accordance with embodiments of the present invention. The superblock 475 may contain a circular array of page IDs 480 for the memory pages allocated to the L1 cache for a particular virtual drive. The superblock 475 may additionally contain a start page index 482 into the circular array and an end page index 484 into the circular array. The start and end pages may change as data is added to the array and as data is flushed from the array. Accordingly, the start and end page indexes 482, 484 may be updated over time. The superblock 472 may additionally include a first identifier 486 or pointer to a start page of the L2 cache allocated to the virtual drive and a second identifier 488 or pointer to an end page in the L2 cache allocated to the virtual drive. In recovery after a system failure or power failure, the superblock of the L1 cache is first read to quickly determine the locations of the L1 and L2 caches and/or to quickly retrieve the contents of the L1 and L2 caches.

Returning to FIG. 3, when a DTL module in IO controller 305A generates a cache entry that includes multiple metadata updates, it writes that cache entry to an appropriate page in the local L1 cache 335A and to an appropriate page in the remote L1 cache 330A, and does not make any metadata writes to persistent storage in the storage array 308. The remote L1 cache 330A-B and the corresponding local L1 cache 335A-B are mirror images of one another in some embodiments. In these embodiments, a cache entry in the remote L1 cache 330A-B has the same offset at the same cache entry in the local L1 cache 335A-B. Writes made to memory in the local L1 cache 335A take on the order of a few nanoseconds to complete. Writes made to the memory in the remote L1 cache 330A are made over an interconnect, such as a PCIe connection, and take on the order of 30-40 nanoseconds to complete. In contrast, writes to the storage array 308 take on the order of a few microseconds to complete. Reads by IO controller 305A from the remote L1 cache 330A take on the order of 800-900 ns to be completed. However, writes are made to the remote L1 cache 330A asynchronously, and the IO controller does not wait for acknowledgment that a cache entry has been successfully written to the remote L1 cache 330A before committing a cache entry in embodiments. Accordingly, the write latency associated with writing metadata is on the order of 30-40 nanoseconds in embodiments, compared to the write latency of a few microseconds achieved by conventional intent logs.

Contents of the local L1 cache 335A-B are periodically flushed to the GST cache 352A-B and the VBAT cache 354A-B. For example, the L1 cache may be flushed when the L1 cache becomes full and/or if a threshold amount of time has elapsed since the L1 cache was last flushed. The GST cache 352A-B and VBAT cache 354A-B are then periodically flushed to their respective metadata tables (GST 350, VBAT table 355A, VBAT table 355B). In order to delay the flushing of the GST cache 352A-B and VBAT cache 354A-B to the GST 350 and appropriate VBAT table 355A-B, the hybrid intent logs further include the L2 cache 345A-B. Such delays in flushing the data from the GST cache 352A-B and VBAT cache 354A-B further improve IO performance, for example, by enabling increased numbers of metadata table updates to be batched together and then written in a single update to the appropriate metadata tables.

The L2 cache may be larger than the L1 cache. In one embodiment, the L2 cache is at least 16 times larger than the L1 cache. In some embodiments, each L2 cache contains about 128 MB of storage space. Accordingly, in the above example in which the IO controller 305A supports 100 virtual drives, the combined size of the associated 100 L2 caches could be about 12.8 GB. A single page in the L1 cache may correspond to a single page in the L2 cache. The data in the L2 cache 345A-B is held until the time that the GST cache 352A-B and VBAT cache 354A-B are flushed to the GST 350 and appropriate VBAT table 355A-B. At that time the contents of the L2 cache 345A-B may be invalidated and overwritten. In one embodiment, the GST cache 352A-B and VBAT cache 354A-B are flushed at some interval and/or when the L2 cache reaches a threshold level of free space (e.g., when the L2 cache is full, when 10% of the L2 cache is free, when 50% of the L2 cache is free, etc.). For example, the GST cache 352A and VBAT cache 354A may be flushed if a threshold amount of time has elapsed since these caches were last flushed.

In some instances the L2 cache 345A (as well as the GST cache 352A and VBAT cache 354A) may include metadata for a transaction that has not yet completed when the L2 cache 345A becomes full. If this occurs, then the flushing of at least a portion of the GST cache 352A, VBAT cache 354A and L2 cache 345A is delayed until the transaction completes. In some embodiments, a portion of these caches that does not contain the information associated with the uncompleted transaction are flushed without waiting for the transaction to complete. In other embodiments, no data is flushed from these caches until the transaction completes.

In embodiments, particular pages in the L1 cache have designated locations (e.g., pages) in the L2 cache to which they will be written. Accordingly, when the local L1 cache 335A is flushed to the corresponding L2 cache 345A, each page in the local L1 cache may be flushed to a predetermined location in the L2 cache 345A. In some instances pages in the L1 cache have multiple predetermined locations in the L2 cache, and may be written to any one of those multiple predetermined locations when the L1 cache is flushed to the L2 cache. For example, a first page in the L1 cache may be flushed to a first, fifth or ninth page in the L2 cache.

Contents of the local L1 cache 335A-B and/or remote L1 cache 330A-B are copied to the persistent L1 cache 340A-B if any type of system failure is detected. Otherwise the persistent L1 caches 340A-B may remain empty.

Returning to FIG. 2, the VBAT module 235 periodically flushes contents of the VBAT table cache 295 to the VBAT table 275 as discussed above. Similarly, the GST module 230 periodically flushes contents of the GST cache to the GST 280. The VBAT module 235 and the GST module 230 may flush pages of their respective caches to the VBAT table 275 and GST 280 at the same time or at different times. Once both the VBAT table cache 295 and GST cache 290 flush metadata table updates derived from a page in the L1 cache, then the corresponding page that was flushed to the L2 cache may be discarded and an area of the L2 cache freed because the updates have now been persisted in the appropriate tables.

If a failure of the IO controller 205 occurs or a power failure occurs, then the contents of the VBAT table cache(s) 295 and GST cache 290 will be lost. However, the updates made to these caches are still stored in the L2 cache(s) 270. Accordingly, if such a failure occurs, then after the IO controller 205 recovers or another IO controller takes over for the IO controller 205 contents of the L2 cache(s) are replayed and flushed to the VBAT table(s) 275 and GST 280. Additionally, contents of the persistent L1 cache(s) 265 may be read and copied into the local L1 cache(s) 255 and remote L1 cache(s) 260. The contents of the L1 cache(s) may then be replayed and flushed to the VBAT table(s) 275 and GST 280 after the contents of the L2 cache(s) have been flushed. Recovery is then complete, and the recovered IO controller 205 or replacement IO controller may resume standard operations.

As discussed above, there are multiple different types of failures that are protected from in embodiments, including a power failure, a failure of the IO controller 205 and a failure of the management controller 250. The DTL module 225 may perform operations to recover from a power failure, failure of management controller 250 and/or a failure of the IO controller 205 or another IO controller. Additionally, the management controller 250 may perform operations to recover from any of these types of failures.

Returning to FIG. 3, the management controller 310 may use a heartbeat mechanism to determine a status of each of the IO controllers 305A-B. Management controller 310 may use this heartbeat mechanism to continuously or periodically check on the status of the IO controllers 305A-B and determine whether either IO controller 305A-B has failed. In one embodiment, the heartbeat mechanism is a memory based mechanism. Management controller 310 may allocate a small area of memory to each of the IO controllers 305A-B. For example, a first area of memory 325 may be allocated for heartbeats with IO controller 305A and a second area of memory 325 may be allocated for heartbeats with IO controller 305B. To issue a heartbeat to IO controller 305A, management controller 310 may write a heartbeat message to the area of memory 325 allocated for heartbeats with IO controller 305A. If IO controller 305A is functional, then IO controller 305A writes a response message to the area of memory that was allocated for heartbeats with IO controller 305A. If the management controller 310 fails to receive a response message in the memory allocated for heartbeats with IO controller 305A, then management controller 310 may determine that IO controller 305A has failed. In response to making such a determination, management controller 310 may write contents of the remote L1 cache 330A to persistent L1 cache 340A. That way the L1 cache is persisted in case anything then happens to the management controller 310. Alternatively, management controller 310 may flush the contents of the remote L1 cache 330A to memory, in which case the contents of the remote L1 cache 330A may be cleared from memory 325.

Management controller 310 may wait for IO controller 305A to recover after a crash, or may assign the responsibilities of IO controller 305A to another IO controller (e.g., to IO controller 305B). If IO controller 305A recovers, then IO controller 305A may re-register all of the virtual drives that were previously handled by the IO controller 305A. Each IO controller 305A-B may be allocated a particular region on storage array 308 for that IO controller's persistent L1 cache 340A-B and L2 cache 345A-B. Accordingly, IO controller 305A may read the contents of the persistent L1 cache 340A from the known region in memory assigned to IO controller 305A and write those contents to the remote L1 cache 330A and local L1 cache 335A. Alternatively, if the remote L1 cache 330A still retains the current data that was written to the persistent L1 cache 340A, then IO controller 305A may forego reading the contents of the persistent L1 cache 340A and may simply copy the contents of the remote L1 cache 330A to the local L1 cache 335A.

In one embodiment, for each registered virtual drive the IO controller 305A reviews the superblock associated with the L1 caches to determine if that virtual drive had previously been registered. IO controller 305A may additionally determine, for each virtual drive that was previously registered, which memory pages were allocated for the L1 cache associated with that virtual drive.

IO controller 305A may additionally read a superblock of the L2 caches to determine which pages were allocated for the L2 caches of each of the registered virtual drives handled by the IO controller 305A. The superblock may additionally identify a start page and end page of each L2 cache. IO controller 305A may use this information to determine an order in which to read pages from the L2 cache 345A and replay the contents of these pages. Replaying the contents of the pages may include reading the pages from storage array 308, walking through the pages, and for each page writing updates in that page to the GST cache 352A and/or VBAT cache 345A (or directly to the GST 350 and/or VBAT tables 355A) if those updates are committed (as identified by a commit pointer in each page). This process may be performed for the L2 caches associated with each of the virtual drives handled by the IO controller 305A.

Once the metadata updates from the pages of the L2 cache 345A have been written to the appropriate caches and/or tables, the metadata updates from the L1 cache may similarly be written to the appropriate caches and/or tables Like the L2 cache, the L1 cache includes a separate start pointer and end pointer to identify the order in which to replay the contents of the L1 cache. Similarly, commit pointers in each of the pages of the L1 cache may be used to determine which metadata updates to write and which metadata updates to discard. Those metadata updates in cache entries after the commit pointer are considered invalid, and are not replayed. Once the contents of the L2 and L1 caches are written to the appropriate metadata tables, then the IO controller 305A may resume standard operations for the virtual drives handled by that IO controller 305A.

If the IO controller 305A does not recover within a threshold amount of time from a time that the crash of the IO controller 305A occurred, then management controller 305 may reassign the responsibilities of the IO controller 305A to IO controller 305B. Management controller 310 may notify IO controller 305B of the locations of the persistent L1 cache 340A and L2 cache 345A associated with IO controller 305A. IO controller 305B then replays the contents of the L2 cache 345A and the persistent L1 cache 340A or remote L1 cache 330A in the manner discussed above with reference to recovery of IO controller 305A. However, the IO controller 305B has its own locations for the persistent L1 cache 340B, remote L1 cache 330B and L2 cache 345B allocated to it. Accordingly, once the L2 cache 345A and persistent L1 cache 340A are recovered, IO controller 305B then resumes operations for the virtual drives that were previously handled by IO controller 305A using persistent cache L1 340B, remote L1 cache 330B and L2 cache 345B.

The storage server 300 may include a power controller (not shown) that runs in a power subsystem of the storage server 300. The power controller may detect when power to the storage server is lost. When a power loss is detected, the power controller sends a message (e.g., as an interrupt) to the management controller 310 informing the management controller 310 that power has been lost to the storage server 300. Management controller 310 then sends messages (e.g., as interrupts) to each of the IO controllers 305A-B instructing the IO controller 305A-B to pause new IO operations and/or to write the contents of the local L1 cache 335A-B to a corresponding persistent cache 340A-B. Alternatively, the management controller 310 may flush contents of the remote L1 caches 330A-B to the corresponding persistent caches 340A-B. In some embodiments the IO controllers 305A-B may have a greater bandwidth connection to the storage array 308. In such an embodiment it can be faster for the IO controllers 305A-B to flush the contents of the L1 cache to the storage array 308. The storage server 300 may include a sufficient battery backup to enable each of the IO controllers 305A-B in the storage server 300 to write the contents of their L1 caches to the storage array 308 before the storage server 300 shuts down.

IO controllers 305A-B may use a different mechanism to detect whether the management controller 310 has failed than the heartbeat mechanism used by the management controller 310 to detect failure of the IO controllers 305A-B. Specifically, each IO controller makes asynchronous writes to their respective remote L1 caches 330A-B. Because the writes are asynchronous, the IO controllers periodically perform reads on the remote L1 cache 330A-B to verify that previous writes to the L1 cache 330A-B were successful. In one embodiment, these periodic reads of the remote L1 cache 330A-B occur more frequently than the heartbeat messages used by the management controller 310. If an IO controller 305A-B receives an error message after attempting to read contents of the remote L1 cache 330A-B, then the IO controller 305A-B may determine that the management controller 310 has failed. Alternatively, the IO controllers 305A-B may use the same heartbeat mechanism used by management controller 310, and may determine that management controller 310 has failed after failing to receive a heartbeat message from the management controller 310. On detecting that the management controller has failed, the IO controller 305A-B may write the contents of the local L1 cache 335A-B to the corresponding persistent L1 cache 340A-B.

If management controller 310 fails, then another management controller (not shown) in the storage server 300 may take over the responsibilities of management controller 310. The other management controller may perform PCIe enumeration to discover and connect to all devices on the storage server previously managed by management controller 310. Alternatively, the other management controller may have previously performed such PCIe enumeration, and may rely on the previously performed PCIe enumeration. The new management controller may then send a notice to IO controllers 305A-B that the new management controller is taking over for the failed management controller 310. The new management controller may set up the same in memory structures that the management controller 310 was using, such as the remote L1 cache 330A and remote L1 cache 330B. Addressing for pages in memory and in storage array 308 may remain the same in the switch from the management controller 310 to the new management controller. The new management controller may instruct each of the IO controllers 305A-B to memory map a region of the memory of the new management controller for the remote L1 caches 330A-B to virtual address spaces of the memory 320A-B and to copy the local L1 cache 335A-B to the corresponding remote L1 cache 330A-B. The IO controllers 305A-B may then each replay the contents of their respective L1 and L2 caches to update the GST 350 and appropriate VBAT tables 355A-B.

FIGS. 8A-13 are flow diagrams of various implementations of methods related to use of a hybrid intent log (distributed transaction log). The methods are performed by processing logic that may include hardware (circuitry, dedicated logic, etc.), software (such as is run on a general purpose computer system or a controller in a storage server of other system), or a combination of both. Some methods may be performed by a module on an IO controller, such as DMS modules 109A-Y of FIG. 1, DMS module 210 of FIG. 2 and/or DTL module 225 of FIG. 2. Some methods may be performed by a module of a management controller, such as failure and recovery module 170 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 8A:
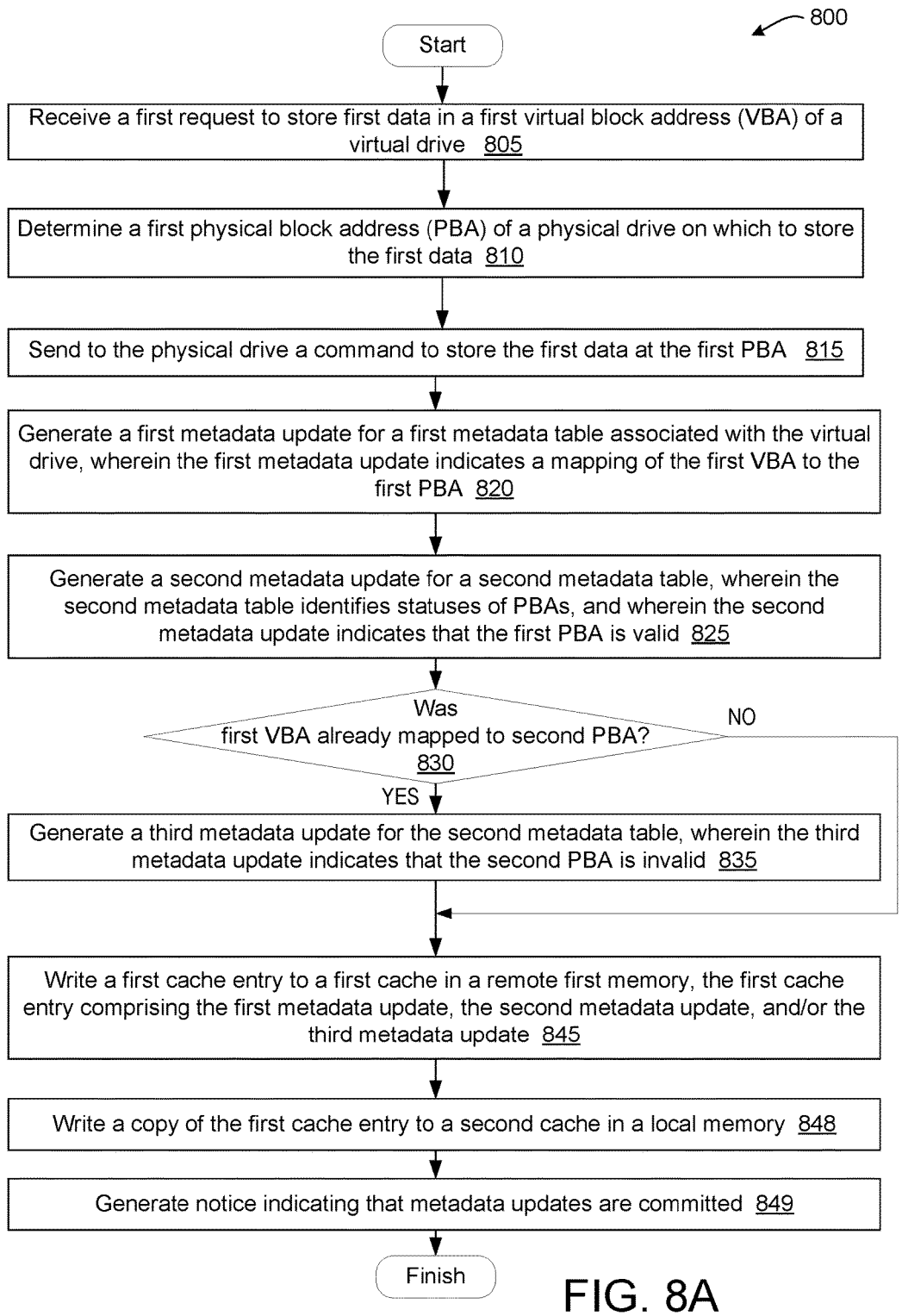
FIG. 8A is a flow diagram of one embodiment for a method of storing metadata for a write operation with minimal latency.

FIG. 8A is a flow diagram of one embodiment for a method 800 of storing metadata for a write operation with minimal latency. At block 805 of method 800, processing logic receives a first request to store first data in a first virtual block address of a virtual drive. The request may be a host write request (application level write command). At block 810, processing logic determines a first physical block address of a physical drive on which to store the first data. At block 815, processing logic sends to the physical drive a command to store the first data at the first physical block address. At block 820, processing logic generates a first metadata update for first metadata table associated with the virtual drive, when the first metadata update indicates a mapping of the first virtual block address to the first physical block address. At block 825, processing logic generates a second metadata update for a second metadata table, when the second metadata update identifies statuses of physical block addresses, and wherein the second metadata update indicates that the first physical block address is valid. The first metadata table may be a VBAT table and the second metadata table may be a GST in embodiments.

At block 830, processing logic determines whether the first virtual block address was already mapped to a second physical block address. In one embodiment, this determination is made prior to generation of the first and second metadata update. If at block 830 it is determined that the first virtual block address was already mapped to a second physical block address, then the method proceeds to block 835. Otherwise, the method proceeds to block 845.

At block 835, processing logic generates a third metadata update for the second metadata table, wherein the third metadata update indicates that the second physical block address is invalid. At block 845, processing logic writes a first cache entry to a first cache in a remote first memory, the first cache entry comprising the first metadata update, the second metadata update, and/or the third metadata that update. At block 848, processing logic writes a copy of the first cache entry to a second cache in a local memory. The first cache may be a remote L1 cache and the second cache may be a local L1 cache in embodiments. At block 849, processing logic generates a notice indicating that the metadata updates are committed.

The metadata updates associated with a host write command are not written to persistent storage in an IO core path in embodiments. Instead, the metadata updates are written to memory as part of the IO core path, and are later asynchronously written to persistent storage. This provides numerous advantages, such as the ability to batch metadata updates, discard some metadata updates, reduce IOPS, and reduce latency of the IO core path for write operations, among other advantages.

Embodiments described herein are primarily described with reference to updates to two different metadata tables. However, it should be understood that embodiments work equally well for multi-block or multipage updates to a single metadata table, such as an inode table in a filesystem. Moreover, embodiments are described with reference to a storage server, but also apply to other systems having a memory and a persistent storage on which data is stored (e.g., such as server computers, desktop computers, laptop computers, mobile phones, tablet computers, and so on).

Figure 8B:
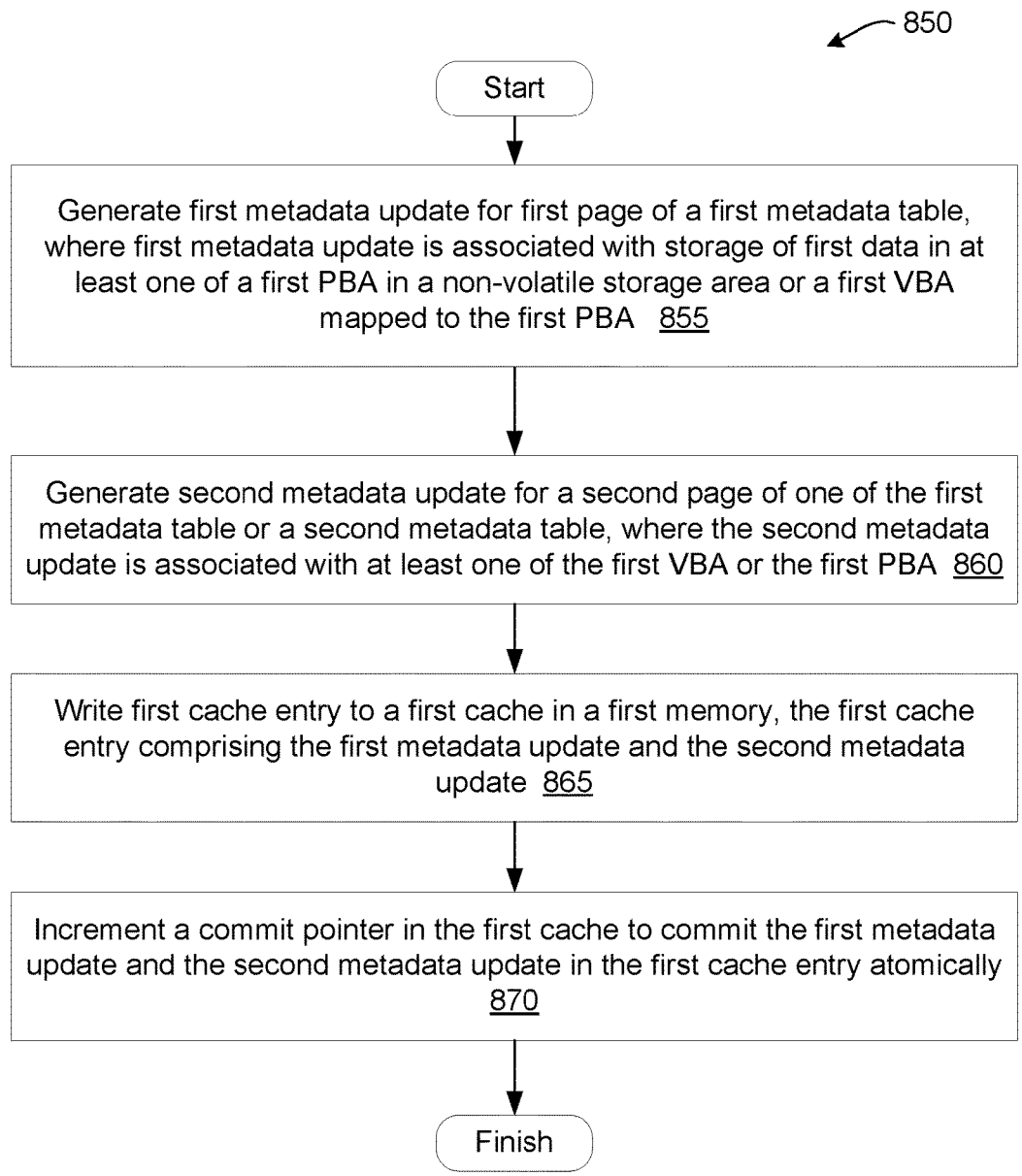
FIG. 8B is a flow diagram of one embodiment for a method of storing metadata for a write operation with minimal latency.

FIG. 8B is a flow diagram of one embodiment for a method 850 of storing metadata for a write operation with minimal latency. At block 585 of method 850, processing logic generates a first metadata update for a first page of a first metadata table, where the first metadata update is associated with storage of first data in at least one of a first physical block address in a nonvolatile storage area or a first virtual block address mapped to the first physical block address. At block 860, processing logic generates a second metadata update for second page of one of the first metadata table for a second metadata table, where the second metadata update is associated with at least one of the first virtual block address or the first physical block address. At block 865, processing logic writes a first cache entry to a first cache in a first memory, the first cache entry comprising the first metadata update and the second metadata update. At block 870, processing logic increments a commit pointer in the first cache to commit the first metadata update and the second metadata update in the first cache entry atomically (e.g., transactionally). Accordingly, method 850 enables updates to multiple different pages and or blocks in a persistent storage to be committed atomically using a hybrid intent log or distributed transaction log as discussed in embodiments herein.

Figure 9:
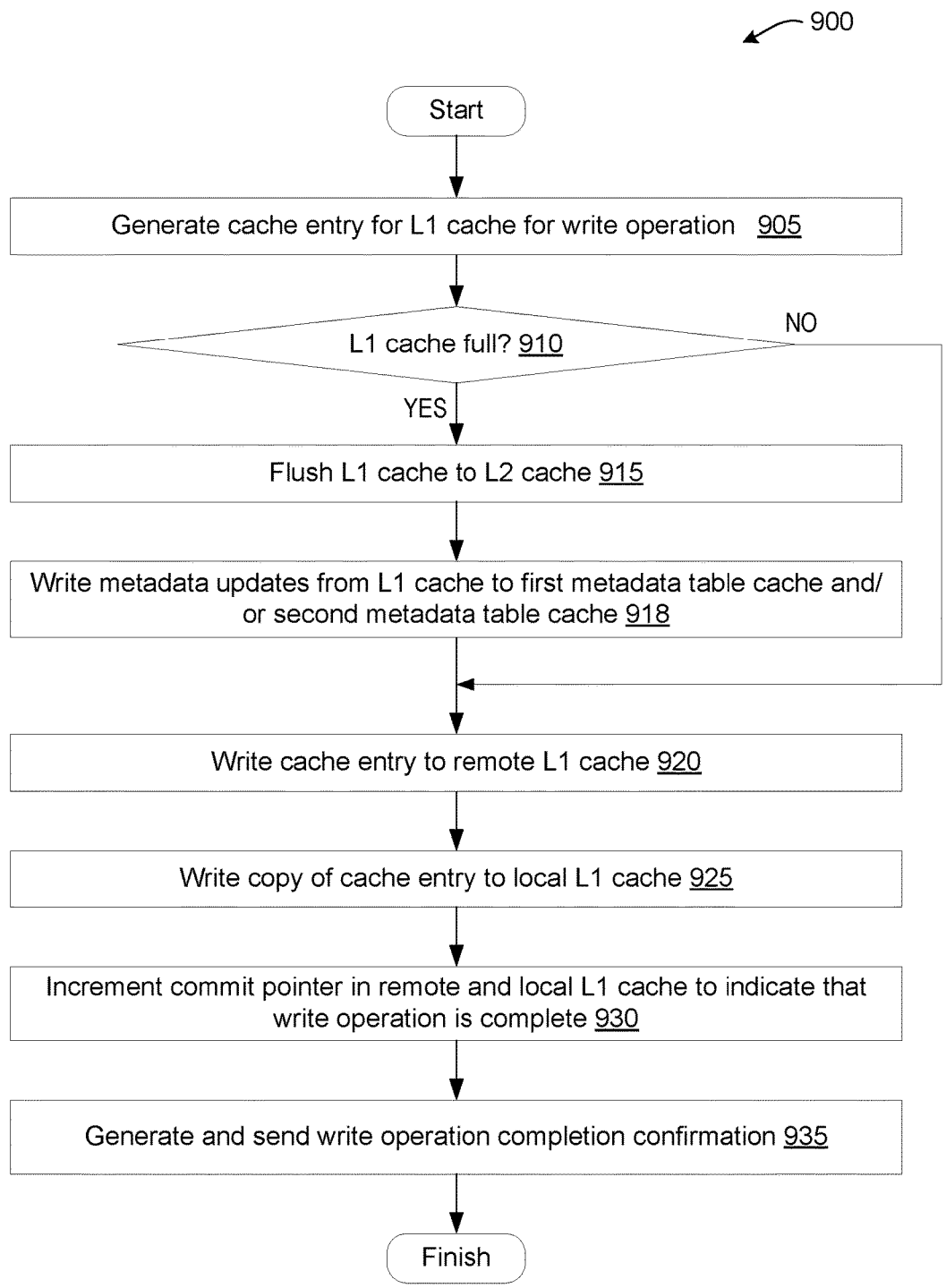
FIG. 9 is a flow diagram of one embodiment for a method of flushing contents of an L1 cache.

FIG. 9 is a flow diagram of one embodiment for a method 900 of flushing contents of an L1 cache that is part of a hybrid intent log. At block 905 of method 900, processing logic generates a cache entry for an L1 cache for a storage level write operation. At block 910, processing logic determines whether the L1 cache is full. If the L1 cache is not full, the method proceeds to block 920. If the L1 cache is full, the method continues to block 915, at which processing logic flushes the L1 cache to an L2 cache of the hybrid intent log. At block 918, processing logic additionally writes metadata updates from the L1 cache to a first metadata table cache and or to a second metadata table cache.

At block 920, processing logic writes the cache entry to a remote L1 cache that is in a memory of a processing device and/or controller other than a processing device and/or controller that is executing method 900. At block 925, processing logic writes a copy of the cache entry to a local L1 cache that is in a memory of the processing device and/or controller that is executing method 900. At block 930, processing logic increments a commit pointer in the remote L1 cache and local L1 cache to indicate that the storage level write operation is complete. At block 935, processing logic generates and sends a write completion confirmation.

Figure 10:
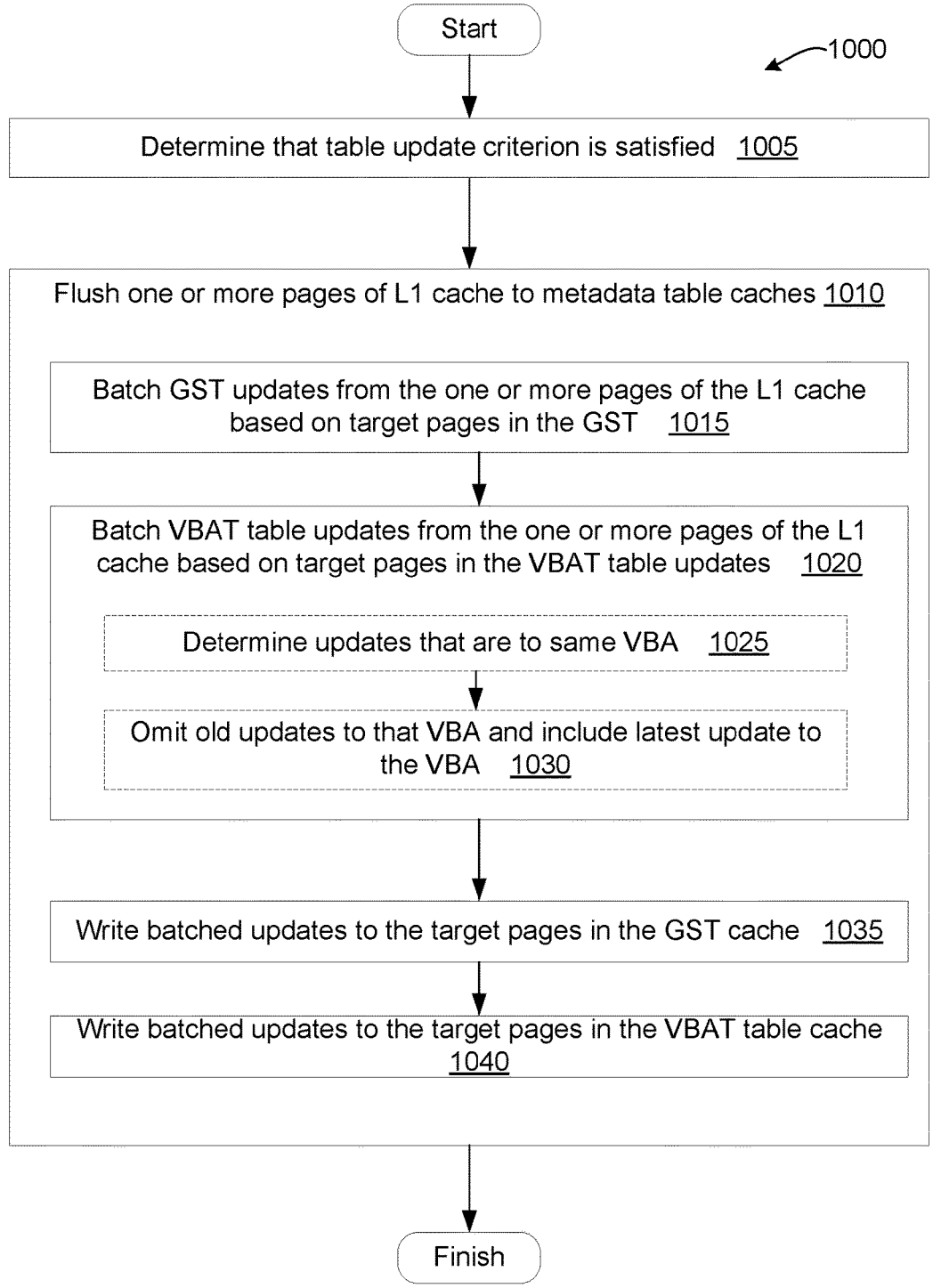
FIG. 10 is a flow diagram of one embodiment for a method of flushing contents of an L1 cache to one or more metadata table caches.

FIG. 10 is a flow diagram of one embodiment for a method 1000 of flushing contents of an L1 cache of a hybrid intent log to one or more data table caches. Block 1005 of method 1000, processing logic determines that the table update criterion is satisfied. Will update criterion may be satisfied, for example, if the L1 cache becomes full.

At block 1010, processing logic flushes one or more pages of the L1 cache to one or more metadata table caches. The metadata table caches may be caches of metadata tables that are stored in persistent storage. Flushing the one or more pages of the L1 cache may include, at block 1015, batching global stripe table updates from one or more pages of the L1 cache based on target pages in a global stripe table (GST). This may include analyzing cache entries in the one or more pages to determine pages in the GST that will be updated for each of the cache entries. A single write operation may be generated for each page in the GST that will be updated. Each such write operation may include multiple metadata updates to different entries in a single page of the GST.

At block 1020, processing logic may batch VBAT table updates from one or more pages of the L1 cache based on target pages in a VBAT table. This may include analyzing cache entries in the one or more pages of the L1 cache to determine pages in the VBAT table that will be updated for each of the cache entries. A single write operation may be generated for each page in the VBAT table that will be updated. Each such write operation may include multiple metadata updates to different entries in a single page of the VBAT table.

In one embodiment, at block 1025 processing logic determines updates that are to the same virtual block address. For example, a first metadata update may indicate that a virtual block address should be mapped to a first physical block address, a second metadata update may indicate that the first virtual block address should be mapped to a second physical block address, and a third metadata update may indicate that the first virtual block address should be mapped to a third physical block address. In such an example, the third metadata update would take precedence and would render the first and second metadata updates to the VBAT table moot. Accordingly, at block 1030 processing logic omits or skips the old updates to that virtual block address and includes only the latest update to that virtual block address in the batched VBAT table updates.

At block 1035, processing logic writes batched updates to target pages in a GST cache, where the GST cache is an in memory cache of a GST located on persistent storage. At block 1040, processing logic writes batched updates to pages in a VBAT table cache, where the VBAT table cache is an in memory cache of a VBAT table located in persistent storage.

Note that the operations set forth in blocks 1015-1040 may additionally or alternatively be performed for other metadata tables than a GST and VBAT table. For example, block 1015 may be omitted and block 1020 may instead batch inode table updates for one or more inodes in a file system using the same principles described above. Alternatively, or additionally, metadata updates for other types of metadata tables may also be batched.

Figure 11:
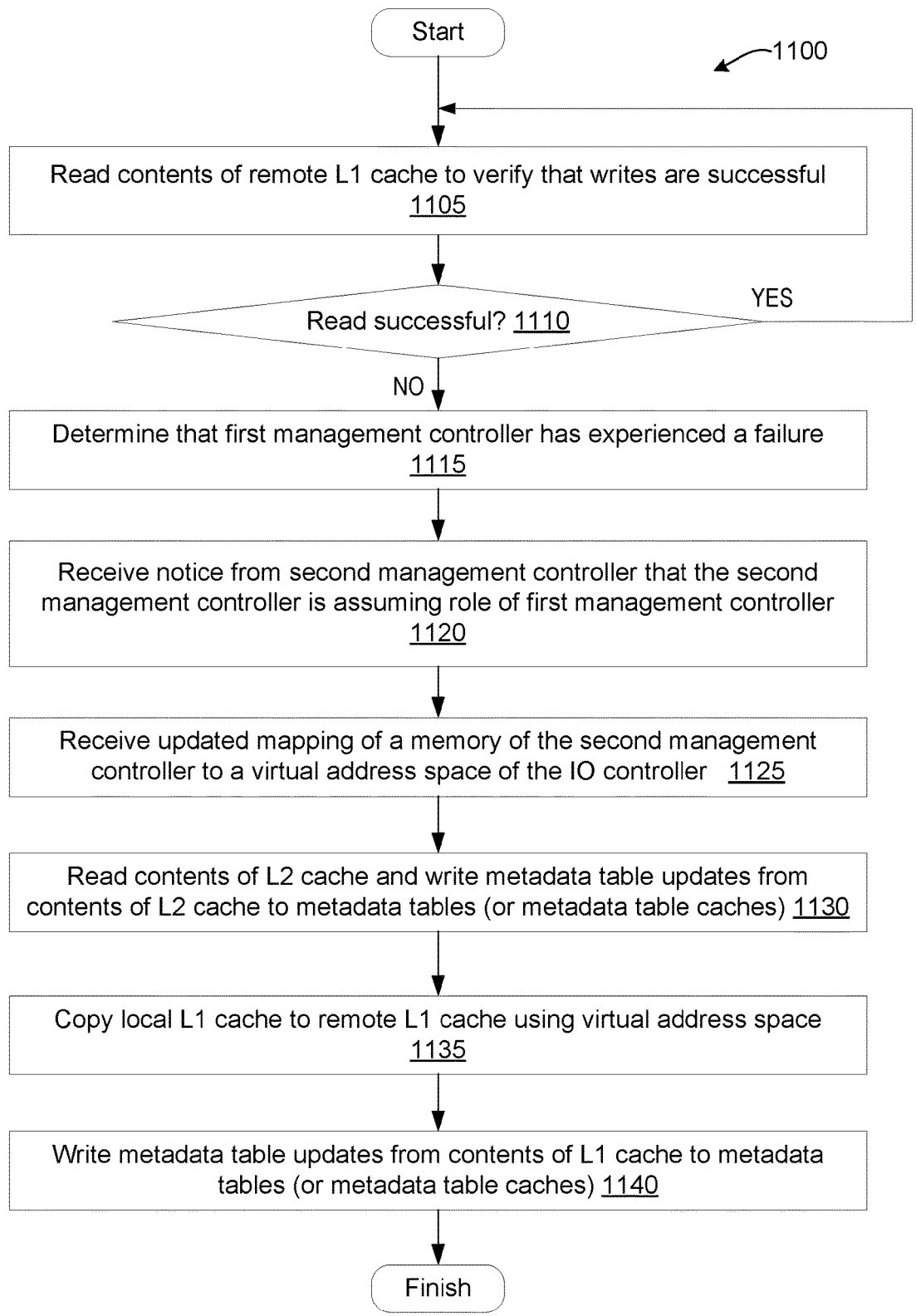
FIG. 11 is a flow diagram of one embodiment for a method of recovering from a crash of a management controller.

FIG. 11 is a flow diagram of one embodiment for a method 1100 of recovering from a crash of a management controller. Method 1100 may be performed, for example, by a DTL module of an IO controller or a dedicated recovery module of the IO controller. The DTL module may perform asynchronous writes to a remote L1 cache in a memory of a management controller. At block 1105 of method 1100, processing logic reads contents of the remote L1 cache to verify that writes are successful. These reads may be performed periodically since the writes to the remote L1 cache are performed asynchronously.

At block 1110, processing logic determines whether the read of the remote L1 cache was successful. If the read was successful, then the method returns to block 1105. However, if the read was unsuccessful, then processing logic may determine that the management controller has failed and proceeds to block 1115. In one embodiment, processing logic makes multiple attempts to read the contents of the remote L1 cache, and determines that the management controller has failed after multiple unsuccessful read attempts.

At block 1115, processing logic determines that a first management controller has experienced the failure. In response, processing logic may flush contents of a local L1 cache to persistent storage. At block 1120, processing logic receives a notice from a second management controller indicating that the second management controller is assuming the role of the first management control. At block 1125, processing logic receives an updated mapping of a memory of the second management controller to a virtual address space of the IO controller.

At block 1130, processing logic reads contents of an L2 cache and writes metadata table updates from the contents of the L2 cache to one or more metadata tables and/or metadata table caches. At block 1135, processing logic copies the local L1 cache to the remote L1 cache using the virtual address space. At block 1140, processing logic writes metadata table updates from the contents of the L1 cache to the metadata tables and/or metadata table caches. Processing logic may additionally flush contents of the metadata table caches to the appropriate metadata tables. At this point recovery is complete and standard IO operations may continue.

Figure 12A:
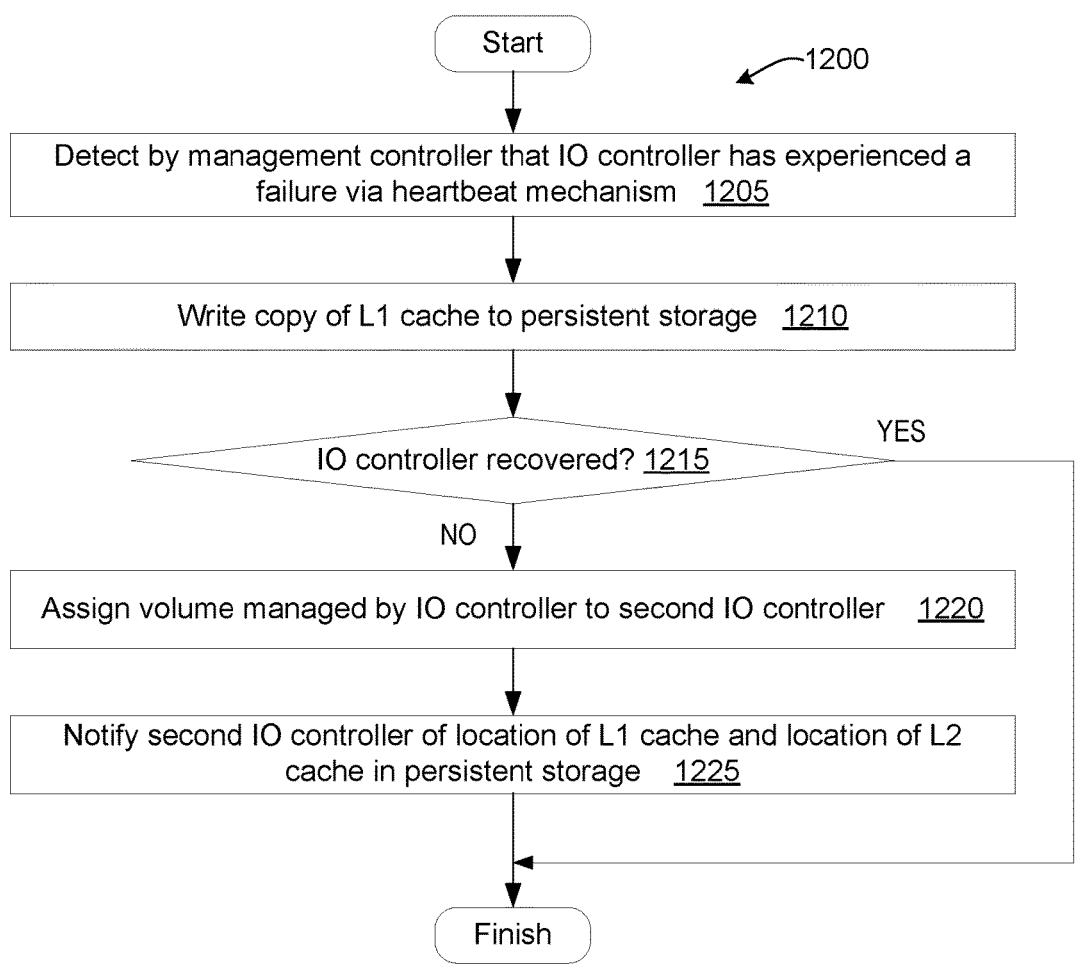
FIG. 12A is a flow diagram of one embodiment for a method of responding to a crash of an input/output controller.

FIG. 12A is a flow diagram of one embodiment for a method 1200 of responding to a crash of an input/output controller. At block 1205 of method 1200, a management controller detects that an IO controller has experienced a failure via a heartbeat mechanism. At block 1210, the management controller writes a copy of an L1 cache of a hybrid intent log to persistent storage.

At block 1215, the management controller determines whether the failed IO controller has recovered within a threshold amount of time. If the IO controller does recover within the threshold amount of time, then the method proceeds to block 1230. If the IO controller does not recover within the threshold amount of time, then the method continues to block 1220.

At block 1220, the management controller assigns a volume (virtual drive) managed by the IO controller to a second IO controller. The management controller notifies the second IO controller of a location of the L1 cache and/or an L2 cache in the persistent storage and/or a copy of the L1 cache in a memory of the management controller.

Figure 12B:
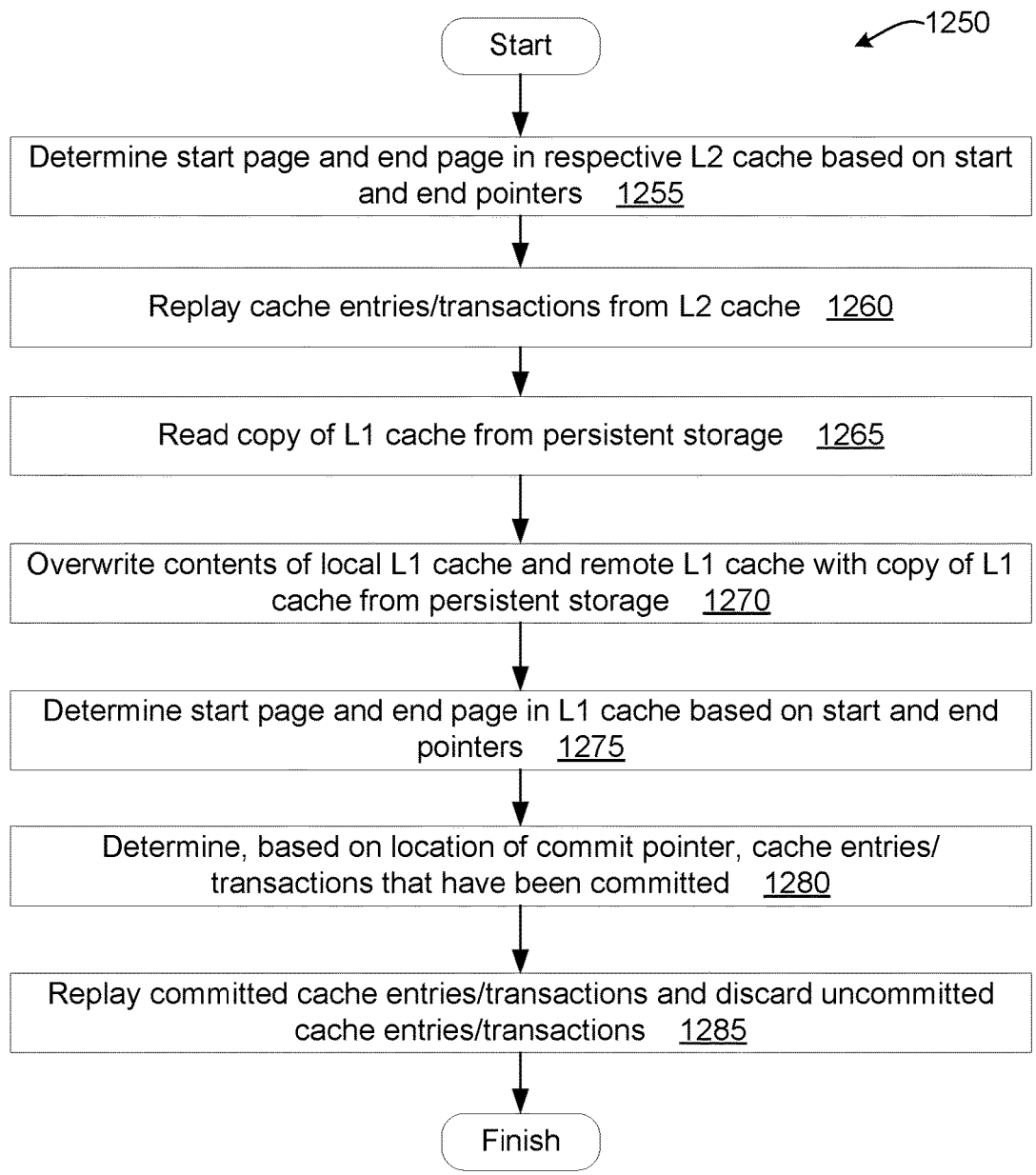
FIG. 12B is a flow diagram of one embodiment for a method of recovering from a crash of an input/output controller.

FIG. 12B is a flow diagram of one embodiment for a method 1250 of recovering from a crash of an input/output controller, and proceeds from method 1200. Method 1250 may be performed by an IO controller that failed and has recovered or by a second IO controller that has taken over responsibility of a failed controller.

At block 1255 of method 1250, processing logic determines a start page and an end page in an L2 cache based on start and end pointers for the L2 cache. Processing logic may determine the start and end page by reading a superblock associated with the L2 cache. At block 1260, processing logic replays cache entries and transactions from the L2 cache. This may include starting from the first page in the L2 cache, reading contents of the first page and one or more additional pages and writing those contents into a memory of the IO controller. Metadata updates represented in cache entries in the pages may then be performed to update one or more metadata tables such as a GST and a VBAT table.

At block 1265, the IO controller reads the copy of the L1 cache from the persistent storage. At block 1270, the IO controller overwrites contents of the local L1 cache of that IO controller and a remote L1 cache of the management controller with the copy of the L1 cache read from the persistent storage. Alternatively, the IO controller may copy contents of the remote L1 cache into the local L1 cache, and may not read the contents of the L1 cache from persistent storage.

At block 1275, the IO controller determines a start page and an end page in the L1 cache based on start and end pointers. At block 1280, the IO controller determines, based on locations of commit pointers in pages of the L1 cache, which cache entries in those pages have been committed. At block 1285, the IO controller replays committed cache entries and/or transactions. Those cache entries and/or transactions that have not been committed are discarded. At this point the metadata tables are up-to-date and the IO controller may begin standard input/output operations.

Figure 13:
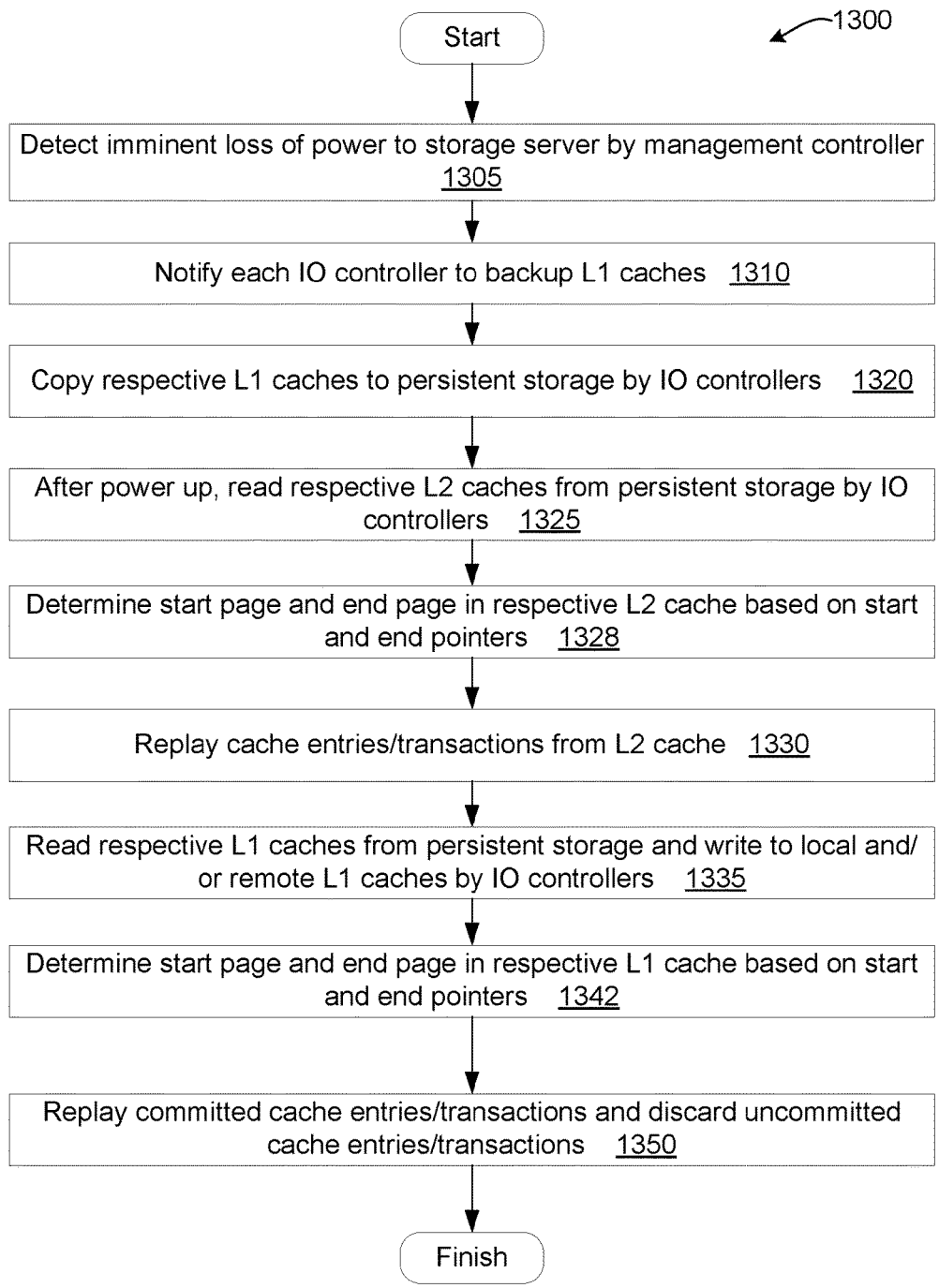
FIG. 13 is a flow diagram of one embodiment for a method of recovering from a power failure.

FIG. 13 is a flow diagram of one embodiment for a method 1300 of recovering from a power failure. At block 1305 of method 1300, processing logic detects an imminent loss of power to a storage server. The imminent loss of power may be detected, for example, by a management controller of the storage server. At block 1310, processing logic notifies each IO controller of the storage server to backup L1 caches of those IO controllers. The stored server may include a battery backup that provides enough time for each of the IO controllers to flush the contents of their L1 caches to persistent storage before power is lost. At block 1320, each of the IO controllers copies respective L1 caches of those IO controllers to persistent storage.

At block 1325, after power is restored to the storage server each of the IO controllers reads respective L2 caches associated with those IO controllers from persistent storage. Block 1328, each IO controller determines a start page and an end page in the respective L2 cache based on start and end pointers. At block 1330, each IO controller replays cache entries and/or transactions from its respective L2 cache beginning with the start page.

At block 1335, each IO controller reads respective L1 caches from persistent storage and writes the contents of the respective L1 caches in persistent storage to a remote L1 cache and/or local L1 cache in memory. At block 1342, each IO controller determines a start page and end page in its respective L1 cache based on start and end pointers. At block 1350, each IO controller replays committed cache entries and/or transactions from the L1 cache and discards any uncommitted cache entries and/or transactions. At this point one or more metadata tables are up-to-date and standard IO operations may begin.

As discussed above, efficiency improvements may be achieved for an IO core path in embodiments by batching metadata updates from entries in an L1 cache that are to the same pages in metadata tables. Additionally, efficiency improvements are also achieved for recovery operations by batching metadata updates from entries in an L2 cache in a similar manner. For example, pages in an L2 cache may be read, and metadata updates from cache entries in those pages may be batched into updates to pages in a GST and into updates to pages in VBAT tables. Accordingly, embodiments provide efficiency improvements both for an IO core path and for disaster recovery operations.

Figure 14:
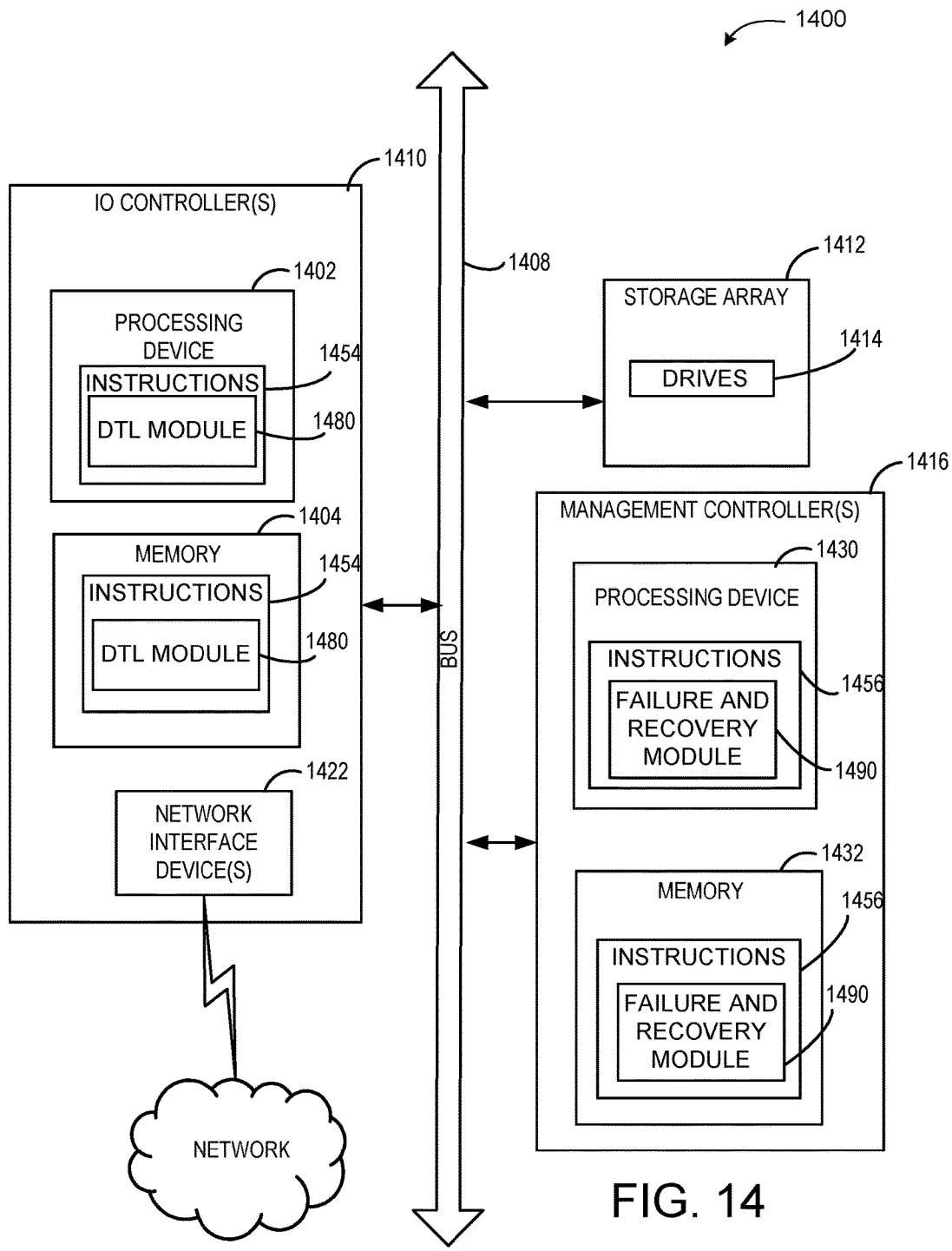
FIG. 14 illustrates an example computing device, in accordance with one embodiment.

FIG. 14 illustrates a diagrammatic representation of a machine in the example form of a computing device 1400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1400 includes one or more IO controllers 1410, a storage array 1412, and a management controller 1416 (or multiple management controllers 1416), which communicate with each other via a bus 1408. Bus 1408 may include one or more switches (e.g., switch 110 of FIG. 1) and one or more storage fabrics (also referred to as backplane fabrics). Each storage fabric includes hardware (e.g., switches, etc.) that connects IO controllers 1410 to physical drives 1414. Each storage fabric may include a fabric board (e.g., a printed circuit board (PCB) that includes multiple hardware components). Alternately, multiple storage fabrics may be part of a single backplane printed circuit board (PCB). Each storage fabric enables any IO controller 1410 to connect to any drive 1414. Each storage fabric may be independent of other storage fabrics, using its own hardware, ports, connections, etc. that are distinct from those used by the other storage fabrics. Accordingly, any component in a storage fabric fails and causes that storage fabric to fail, the IO controllers 1410 may continue to maintain connections to the drives 1414 via an alternative storage fabric.

Each IO controller 1410 represents a device configured to connect one or more host computing devices to one or more drives (e.g., IO controller 108A-Y of FIG. 1). An IO controller 1410 includes a processing device 1402, and a memory 1404 (e.g., read-only memory (ROM), flash memory, dynamic random access memory (DRAM) such as synchronous DRAM (SDRAM) or Rambus DRAM (RDRAM), etc.). The IO controller 1410 may further include one or more network interface devices 1422 to connect to a network. In one embodiment, each IO controller 1410 is a system on a chip (SoC) including processing device 1402, memory 1404, and one or more network interface devices 1422.

Management controller 1416 represents a device configured to manage a storage fabric. The management controller 1416 may be configured to perform particular operations with regards to management of the array of drives 1414 in storage array 1412. Management controller 1416 may include a memory 1432 having instructions 1456 and a processing device 1430 that loads and executes those instructions 1456. Memory 1432 may be read-only memory (ROM), flash memory, dynamic random access memory (DRAM) such as synchronous DRAM (SDRAM) or Rambus DRAM (RDRAM), etc. In one embodiment, management controller 1416 is a system on a chip (SoC) including processing device 1430 and memory 1432.

Processing device 1402 and/or processing device 1430 represents one or more general-purpose processors such as a microprocessor, central processing unit, or the like. More particularly, the processing device 1402, 1430 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1402, 1430 may also be one or more special-purpose processing devices such as an application specific integrated circuit (ASIC), a field programmable gate array (FPGA), a digital signal processor (DSP), network processor, or the like. Processing device 1402, 1430 is configured to execute processing logic (e.g., instructions 1454, 1456) for performing operations discussed herein.

The memory 1404, 1432 may be a machine-readable storage medium (or more specifically a computer-readable storage medium) on which is stored one or more sets of instructions 1454, 1456 embodying any one or more of the methodologies or functions described herein. The instructions 1454, 1456 may also reside, completely or at least partially, within the processing device 1402, 1430 during execution thereof by the IO controller 1410 (or management controller 1416), the processing device 1402, 1430 also constituting computer-readable storage media. Alternatively, or additionally, the instructions 1454, 1456 may be resident on drive 1414 (e.g., a solid state storage drive and/or a hard disk drive) connected to bus 1408.

The instructions 1454 may include a DTL module 1480 and/or DMS module (e.g., as described above with respect to FIG. 2), and/or a software library containing methods that call a DTL module 1480 and/or DMS module. In some embodiments instructions 1456 may also include a failure and recovery module 1490. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 1412 represents a group of drives 1414 and/or a device that contains the group of drives 1414. Storage array 1412 may arrange drives 1414 into logical redundant storage containers, or a redundant array of independent disks (RAID). The storage array 1412 may distribute data across the drives 1414 in one of several RAID levels to provide different levels of redundancy and performance. In some implementations, storage array 1412 may include one group of drives 1414 for data and another group of drives 1414 for recovery purposes. Drives 1414 may be physical storage devices such as solid state drives (SSDs) (e.g., SAS/SATA drives, non-volatile memory express (NVMe) drives, small computer system interface (SCSI) over PCIe (SOP) drives, or solid state drives that communicate using different protocols), conventional disk drives, or any other storage media. The number of drives 1414 included in storage array 1412 may be less than 10 to more than 100. The drives 1414 may have the same or different storage capacities.

The modules, components and other features described herein (for example in relation to FIG. 2) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "generating", "sending", "storing", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A storage server comprising:
   a plurality of physical drives arranged in a striped array comprising a plurality of stripes, each of the plurality of stripes having a plurality of stripe positions;
   a management controller comprising a first memory; and
   an input/output (TO) controller operatively coupled to the plurality of physical drives and to the management controller, the IO controller comprising a second memory, wherein the IO controller is to:
   receive a first request to store first data in a first virtual block address (VBA) of a virtual drive;
   determine a first physical block address (PBA) of a first physical drive on which to store the first data, wherein the first physical drive is one of the plurality of physical drives, and wherein the first PBA corresponds to a first stripe position for a first stripe of the plurality of stripes;
   send, to the first physical drive, a command to store the first data at the first PBA;
   generate a first metadata update for a virtual block address translation (VBAT) table associated with the virtual drive, wherein the first metadata update indicates a mapping of the first VBA to the first PBA;
   generate a second metadata update for a stripe table, wherein the stripe table identifies statuses of the plurality of stripes, and wherein the second metadata update indicates that the first stripe position for the first stripe is valid;
write a first cache entry to a first cache in at least one of the first memory or the second memory, the first cache entry comprising the first metadata update and the second metadata update;
determine that the first cache is full;
write contents of the first cache to a second cache that is on at least one of the first physical drive or a second physical drive, wherein the second cache is larger than the first cache; and
free the contents of the first cache.

2. The storage server of claim 1, wherein the first cache is in an area of the first memory that is mapped to a virtual address space of the IO controller, and wherein the IO controller is further to:
write a copy of the first cache entry to a second cache in the second memory of the IO controller.

3. The storage server of claim 2, wherein the first cache entry comprises a transaction object for a transaction comprising the first metadata update to the VBAT table and the second metadata update to the stripe table, wherein the IO controller is further to:
increment a commit pointer in the first cache to indicate that the transaction is complete; and
send a response that the first data has been stored responsive to writing the first cache entry to the first cache and the copy of the first cache entry to the second cache.

4. A storage server comprising:
a persistent storage; and
a first controller operatively coupled to the persistent storage, the first controller comprising a first memory, wherein the first controller is to:
generate a first metadata update for a first page of a first metadata table, wherein the first metadata update is associated with storage of first data in at least one of a first physical block address (PBA) in the persistent storage or a first virtual block address (VBA) mapped to the first PBA;
generate a second metadata update for a second page of one of the first metadata table or a second metadata table, wherein the second metadata update is associated with at least one of the first VBA or the first PBA;
write a first cache entry to a first cache in the first memory, the first cache entry comprising the first metadata update and the second metadata update;
increment a commit pointer in the first cache to commit the first metadata update and the second metadata update in the first cache entry atomically;
determine that the first cache is full;
write contents of the first cache to a second cache that is on the persistent storage, wherein the second cache is larger than the first cache; and
free the contents of the first cache.

5. The storage server of claim 4, wherein the first controller is an input/output (TO) controller, the storage server further comprising:
a management controller that comprises a second memory, wherein an area of the second memory is mapped to a virtual address space of the first memory;
wherein the first controller is further to write the first cache entry to a second cache in the area of the second memory.

6. The storage server of claim 5, wherein the first cache entry comprises a transaction object for a transaction comprising the first metadata update and the second metadata update, wherein the TO controller is further to:
send a message that the first data has been stored responsive to writing the first cache entry to the first cache and to the second cache.

7. The storage server of claim 4, wherein the first controller is further to:
receive a first request to store the first data in the first VBA of a virtual drive;
determine the first PBA of a first physical drive of the persistent storage on which to store the first data; and
send, to the first physical drive, a command to store the first data at the first PBA.

8. The storage server of claim 7, wherein the first controller is further to:
responsive to receiving the first request, determine that the first VBA is already mapped to a second PBA; and
generate a third metadata update for the second metadata table, wherein the third metadata update indicates that the second PBA is invalid, and wherein the first cache entry further comprises the third metadata update.

9. The storage server of claim 4, wherein:
the first metadata update indicates a mapping of the first VBA to the first PBA; and
the second metadata update indicates that the first PBA is valid.

10. The storage server of claim 9, wherein:
the persistent storage comprises a plurality of physical drives arranged in a striped array comprising a plurality of stripes, each of the plurality of stripes having a plurality of stripe positions; and
the first PBA corresponds to a first stripe position for a first stripe of the plurality of stripes.

11. The storage server of claim 9, wherein the first controller is further to:
receive a request to store second data in the first VBA;
determine a second PBA of a first physical drive or a second physical drive of a plurality of physical drives;
send, to the persistent storage, a command to store the second data at the second PBA;
generate a third metadata update for the first metadata table, wherein the third metadata update indicates a mapping of the first VBA to the second PBA;
generate a fourth metadata update for the second metadata table, wherein the fourth metadata update indicates that the second PBA is valid;
generate a fifth metadata update for the second metadata table, wherein the fifth metadata update indicates that the first PBA is invalid; and
write a second cache entry to the first cache, the second cache entry comprising the third metadata update, the fourth metadata update and the fifth metadata update.

12. The storage server of claim 11, wherein the first controller is further to:
determine that a table update criterion is satisfied;
write the second metadata update, the fourth metadata update and the fifth metadata update to at least one of the second metadata table or a second metadata table cache for the second metadata table;
determine that the first metadata update and the third metadata update are both for the first VBA, wherein the third metadata update supersedes the first metadata update;
skip the first metadata update and write the third metadata update to at least one of the first metadata table or a first metadata table cache for the first metadata table; and free one or more areas of the first cache on which the first cache entry and the second cache entry were stored.

13. The storage server of claim 4, wherein the first cache entry is one of a plurality of cache entries stored in a first page of the first cache, wherein the first controller is further to:
perform a plurality of metadata updates on at least one of a first metadata table cache for the first metadata table or a second metadata table cache for the second metadata table, each of the plurality of metadata updates being included in one of a) the plurality of cache entries in the first page of the first cache or b) a plurality of additional cache entries in one or more additional pages of the first cache.

14. The storage server of claim 13, wherein to perform the plurality of metadata updates the first controller is further to:
determine a first plurality of metadata updates from at least one of the first page of the first cache or the one or more additional pages of the first cache that will update the first page of the first metadata table;
generate a first batched metadata update for the first page of the first metadata table; and
write the first batched metadata update to the first page of the first metadata table cache.

15. The storage server of claim 14, wherein the first controller is further to:
determine a second plurality of metadata updates from at least one of the first page of the first cache or the one or more additional pages of the first cache that will update the second page of the first metadata table or the second metadata table;
generate a second batched metadata update for the second page of the first metadata table or the second metadata table; and
write the second batched metadata update to the second page of the first metadata table cache or the second metadata table cache.

16. The storage server of claim 4, wherein the persistent storage comprises at least one block storage device, wherein the first page is located on a first block of the at least one block storage device, and wherein the second page is located on a second block of the at least one block storage device.

17. A method comprising:
receiving, by a first controller of a storage server, a first request to store first data in a first virtual block address (VBA) of a virtual drive;
determining, by the first controller, a first physical block address (PBA) of a first physical drive on which to store the first data;
sending, by the first controller to the first physical drive, a command to store the first data at the first PBA;
generating, by the first controller, a first metadata update for a first metadata table associated with the virtual drive, wherein the first metadata update indicates a mapping of the first VBA to the first PBA;
generating, by the first controller, a second metadata update for a second metadata table, wherein the second metadata table identifies statuses of PBAs, and wherein the second metadata update indicates that the first PBA is valid;
writing a first cache entry to a first cache in a first memory, the first cache entry comprising the first metadata update and the second metadata update;
determining that the first cache is full;

writing contents of the first cache to a second cache that is on at least one of the first physical drive or a second physical drive, wherein the second cache is larger than the first cache; and
freeing the contents of the first cache.

18. The method of claim 17, wherein the first physical drive is one of a plurality of physical drives that are managed by the storage server, wherein the plurality of physical drives are arranged in a striped array comprising a plurality of stripes, each of the plurality of stripes having a plurality of stripe positions, and wherein the first PBA corresponds to a first stripe position for a first stripe of the plurality of stripes.

19. The method of claim 18, wherein the first metadata table is a virtual block address translation (VBAT) table and the second metadata table is a stripe table.

20. The method of claim 17, wherein the first controller is an input/output (TO) controller, the first memory is a memory of a management controller, and the first cache is in an area of the first memory that is mapped to a virtual address space of the TO controller, the method further comprising:
writing a copy of the first cache entry to a second cache in a second memory of the TO controller.

21. The method of claim 20, wherein the first cache entry comprises a transaction object for a transaction comprising storage of the first data at the first PBA, the first metadata update to the first metadata table and the second metadata update to the second metadata table, the method further comprising:
incrementing a commit pointer in the first cache to indicate that the transaction is complete; and
sending a message responsive to writing the first cache entry to the first cache and the copy of the first cache entry to the second cache, wherein the message indicates that the first data has been written to the first VBA.

22. The method of claim 17, further comprising:
receiving a second request to store second data in the first VBA;
determining a second PBA of the first physical drive or a second physical drive on which to store the second data;
sending, to the first physical drive or the second physical drive, a command to store the second data at the second PBA;
generating a third metadata update for the first metadata table, wherein the third metadata update indicates a mapping of the first VBA to the second PBA;
generating a fourth metadata update for the second metadata table, wherein the fourth metadata update indicates that the second PBA is valid;
generating a fifth metadata update for the second metadata table, wherein the fifth metadata update indicates that the first PBA is invalid;
writing a second cache entry to the first cache, the second cache entry comprising the third metadata update, the fourth metadata update and the fifth metadata update.

23. The method of claim 22, further comprising:
determining that a table update criterion is satisfied;
writing the second metadata update, the fourth metadata update and the fifth metadata update to at least one of the second metadata table or a second metadata table cache for the second metadata table;
determining that the first metadata update is for a VBA and the third metadata update is for the same VBA, wherein the third metadata update supersedes the first metadata update;

skipping the first metadata update and writing the third metadata update to at least one of the first metadata table or a first metadata table cache for the first metadata table; and freeing one or more areas of the first cache on which the first cache entry and the second cache entry were stored.

24. The method of claim 17, wherein the first cache entry is one of a plurality of cache entries stored in a first page in the first cache, the method further comprising:

performing a plurality of metadata updates on at least one of a first metadata table cache for the first metadata table or a second metadata table cache for the second metadata table, each of the plurality of metadata updates being included in one of a) the plurality of cache entries in the first page or b) a plurality of additional cache entries in one or more additional pages in the first cache.

25. The method of claim 24, wherein performing the plurality of metadata updates comprises:

determining a first plurality of metadata updates from at least one of the first page or the one or more additional pages that will update a particular page of the first metadata table;

generating a first batched metadata update for the particular page of the first metadata table; and writing the first batched metadata update to the particular page of the first metadata table cache.

26. The method of claim 25, further comprising:

determining a second plurality of metadata updates from at least one of the first page or the one or more additional pages that will update a particular page of the second metadata table;

generating a second batched metadata update for the particular page of the second metadata table; and writing the second batched metadata update to the particular page of the second metadata table cache.

27. The method of claim 17, further comprising:

responsive to receiving the first request, determining that the first VBA is already mapped to a second PBA; and generating, by the first controller, a third metadata update for the second metadata table, wherein the third metadata update indicates that the second PBA is invalid, and wherein the first cache entry further comprises the third metadata update.

* * * * *